(12) United States Patent
Jensen

(10) Patent No.: US 12,241,659 B2
(45) Date of Patent: Mar. 4, 2025

(54) TWISTED CONDUIT FOR GEOTHERMAL HEAT EXCHANGE

(71) Applicant: Robert Jensen, Montvale, NJ (US)

(72) Inventor: Robert Jensen, Montvale, NJ (US)

( * ) Notice: Subject to any disclaimer, the term of this patent is extended or adjusted under 35 U.S.C. 154(b) by 188 days.

(21) Appl. No.: 17/902,997

(22) Filed: Sep. 5, 2022

(65) Prior Publication Data

US 2023/0003421 A1     Jan. 5, 2023

Related U.S. Application Data

(63) Continuation-in-part of application No. 16/818,919, filed on Mar. 13, 2020, now Pat. No. 11,435,115.

(51) Int. Cl.
    *F24T 10/15*     (2018.01)
    *F24T 10/00*     (2018.01)

(52) U.S. Cl.
    CPC ........... *F24T 10/15* (2018.05); *F24T 2010/53* (2018.05)

(58) Field of Classification Search
    CPC ... F24T 2010/53; F24T 2010/50; F24T 10/15; F24T 10/17
See application file for complete search history.

(56) References Cited

U.S. PATENT DOCUMENTS

| | | | |
|---|---|---|---|
| 4,421,136 A | 12/1983 | Aubert | |
| 4,903,763 A | 2/1990 | Lavern | |
| 5,339,890 A | 8/1994 | Rawlings | |
| 5,477,914 A | 12/1995 | Rawlings | |
| 5,509,462 A | 4/1996 | Demko | |
| 5,816,314 A | 10/1998 | Wiggs | |
| 6,142,215 A | 11/2000 | Paulsen | |
| 6,212,896 B1 | 4/2001 | Genung | |
| 6,672,371 B1 | 1/2004 | Amerman | |
| 6,860,320 B2 | 3/2005 | Johnson | |
| 6,955,219 B2 | 10/2005 | Johnson, Jr. | |
| 7,363,769 B2 | 4/2008 | Kidwell | |
| 7,380,605 B1 | 6/2008 | Wolf | |
| 7,575,047 B2 | 8/2009 | Lackinger | |
| 8,444,346 B2 | 5/2013 | Talkin | |
| 9,127,858 B2 | 9/2015 | Mckeown | |
| 9,556,856 B2 | 1/2017 | Stewart | |
| 9,909,783 B2 | 3/2018 | Jensen | |
| 9,915,247 B2 | 3/2018 | Stewart | |
| 10,107,563 B2 | 10/2018 | Bergan | |

(Continued)

FOREIGN PATENT DOCUMENTS

| AT | 516384 B1 | 5/2016 |
|---|---|---|
| CN | 201220077284 U | 11/2012 |

(Continued)

*Primary Examiner* — Devon Russell
(74) *Attorney, Agent, or Firm* — Harold G. Furlow

(57) ABSTRACT

A geothermal heat exchange apparatus is disclosed that includes a central conduit, a plurality of pipes, at least one fitting, at least one joint, a sleeve, and a weight. The geothermal heat exchange apparatus is preassembled for insertion into a bore hole and for connection to a supply primary pipe and a return primary pipe that are in fluid communication with a heat pump. The geothermal heat exchange apparatus includes the plurality of pipes in a helical arrangement around the central conduit for geothermal heat exchange. The weight can be included in the preassembled geothermal heat exchange apparatus or added after preassembly.

20 Claims, 17 Drawing Sheets

(56) References Cited

U.S. PATENT DOCUMENTS

| | | |
|---|---|---|
| 2008/0093125 A1 | 4/2008 | Potter |
| 2008/0289795 A1 | 11/2008 | Hardin |
| 2009/0321417 A1 | 12/2009 | Burns |
| 2010/0025008 A1 | 2/2010 | Walford |
| 2013/0292937 A1 | 11/2013 | Manning |
| 2018/0080686 A1 | 3/2018 | Ziegenfuss |

FOREIGN PATENT DOCUMENTS

| | | | | |
|---|---|---|---|---|
| DE | 20320409 U1 | | 8/2003 | |
| DE | 202007000763 U1 | * | 6/2008 | |
| DE | 202009004592 U1 | | 6/2009 | |
| DE | 102007036324 C5 | | 4/2010 | |
| DE | 202010000498 U1 | | 6/2010 | |
| DE | 102010056355 B4 | | 7/2012 | |
| EP | 1387130 A1 | | 2/2004 | |
| EP | 2913607 B1 | | 1/2016 | |
| GB | 2509537 A | | 10/2011 | |
| JP | 2004278866 A | | 10/2004 | |
| JP | 4981516 B2 | | 12/2008 | |
| JP | 6235204 B2 | | 4/2014 | |
| JP | 2016223633 A | * | 12/2016 | ............. F24T 10/15 |
| KR | 100654151 B1 | | 4/2005 | |
| KR | 101170739 B1 | | 10/2011 | |
| KR | 20130133990 A | * | 12/2013 | |
| KR | 101431193 B1 | | 5/2014 | |
| KR | 200478902 Y1 | | 7/2015 | |
| KR | 102421166 B1 | * | 7/2022 | |
| WO | WO03064915 A1 | | 8/2003 | |
| WO | WO2012064387 A1 | | 5/2012 | |
| WO | WO2011023310 A3 | | 7/2012 | |

* cited by examiner

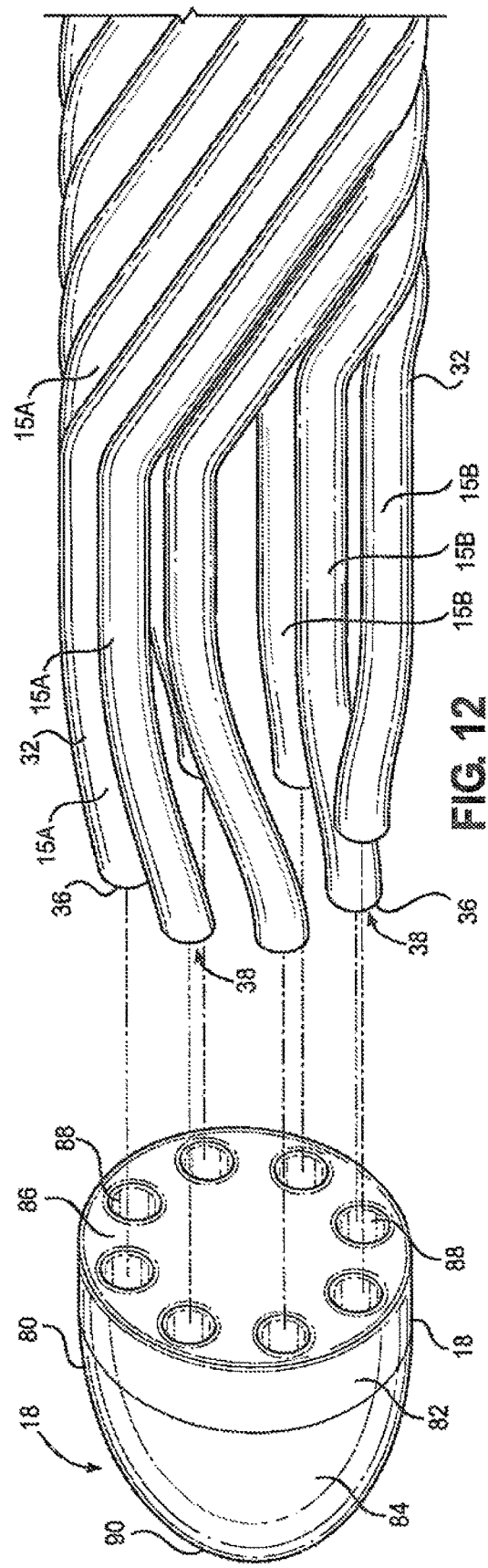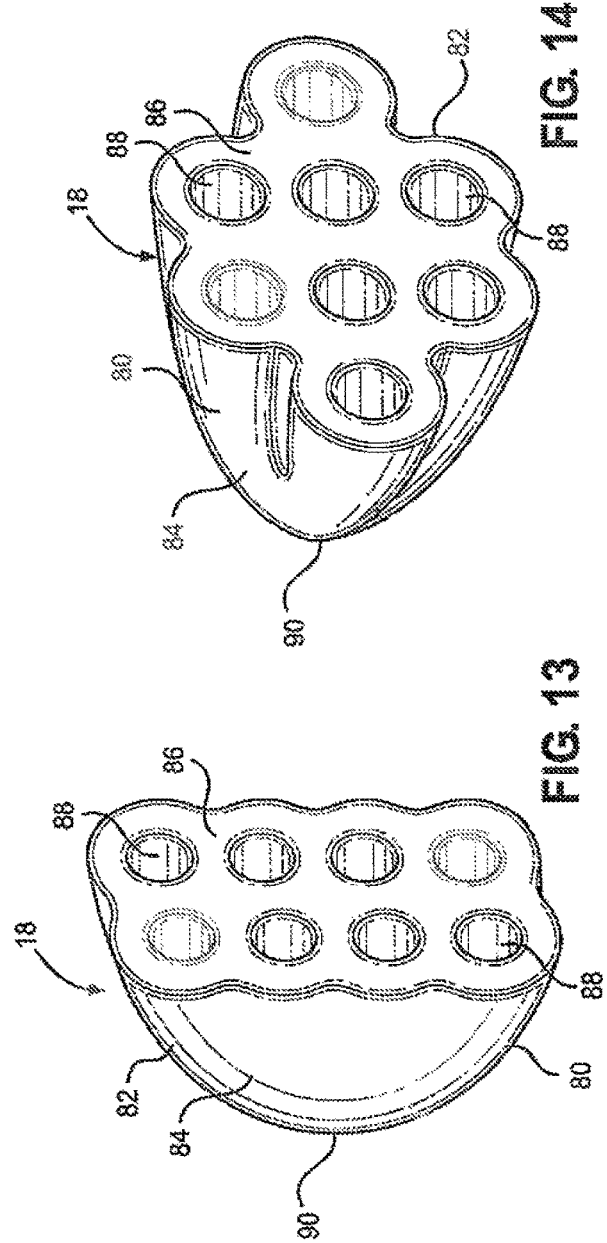

TWISTED CONDUIT FOR GEOTHERMAL HEAT EXCHANGE

BACKGROUND OF THE INVENTION

Field of the Invention

The present disclosures relates to an arrangement of pipes for a geothermal heat exchange apparatus and in particular to a preassembled geothermal heat exchange system that includes a plurality of pipes for heat exchange positioned in a helical configuration around a central conduit, the plurality of pipes connect to at least one fitting and at least one joint and the second end portion of the plurality of pipes includes a sleeve that binds the second end portion of the plurality of pipes together, and a weight is included with the geothermal heat exchange apparatus that is either preassembled in the central conduit or connected to the central conduit at the installation site.

Description of the Related Art

There is a broad array of configurations for the exchange of heat between a structure and a geothermal heat exchanger. FIG. 1 shows one example of a prior art geothermal environmental conditioning system 1. As defined herein, geothermal environmental conditioning system 1 is a heating system and/or a heating and cooling system. The geothermal environmental conditioning system 1 or geothermal system 1 as defined herein includes a structure 2 that is in fluid communication with a heat pump 3 or other similar device that circulates the fluid in primary pipe 4 that are identified as supply pipe 4A and primary return pipe 4B. Supply pipe 4A and return pipe 4B are positioned below grade level 5 on a floor of a trench 6. The floor of trench 6 is below the frost line depth. A plurality of heat exchange pipes 7 are located in a bore hole 8 and extend out of bore hole 8 into trench 6. A prior art connector 9 is connected to each pipe of the plurality of pipes 7 and to supply pipe 4A and/or return pipe 4B that interface with heat pump 3. The prior art connector 9 has the overall shape of a fan with an array of diverging pipes from a single source all aligned in a single plane. The geothermal system 1 defines a closed loop fluid heat exchange system between structure 2, heat pump 3, supply pipe 4A, heat exchange pipe 7 and return pipe 4B. The earth surrounding heat exchange pipe 7 or pipe 7 that is in bore hole 8 below the frost line depth and provides a stabilized thermal baseline for the exchange of heat compared to the above ground ambient environment. Pipes 7 can be positioned on a horizontal floor of trench 6 that is well below frost line depth or in a bore hole 8 that can extend hundreds of feet into the earth.

Geothermal systems 1 are particularly known for their superior performance in delivering energy conserving heating and/or cooling to homes, commercial businesses and industrial buildings in many climates when they can have extended lengths of pipe 7 for the enhanced exchange of heat. The design of geothermal systems includes singular extended lengths of pipe 7 for heat exchange with varying prior art connectors such as manifold type connectors 9 that divide the heat exchange flow into multiple pipes 7 each with a separate angular alignment. For example, geothermal system 1 can include prior art connector 9 that interfaces with supply pipe 4A or another portion of pipe 7 on one end and divides the heat exchange fluid flow into multiple angularly diverging pipes 7 in the opposed end for the improved heat exchange performance of geothermal system 1. A second prior art connector 9 connects to each pipe 7 and converges the heat exchange fluid flow from the multiple pipes 7 into single return pipe 4B. See U.S. Pat. No. 9,127,858 to McKeown et al.

In contrast, prior art geothermal system 1 is a compact helical arrangement of pipes 7 and the use of prior art connector 9 with its wide diverging alignment of pipes 7 is difficult to work on and to connect the diverging alignment of pipes 7 in the bottom of a confined five (5) foot deep trench. This makes for an unnecessarily complex, time consuming and thereby expensive connection between pipes 7 and prior art connector 9 when there are no other manifold type prior art connector 9 options available for geothermal system 1 applications.

Both of the above approaches have been limited by the (1) increased cost of performing a sizable number of connections between pipes 7 and other pipes 7 and/or between pipes 7 and connectors 9 (or "pipe 7 connections") under field conditions, (2) reduced reliability of making pipe 7 connections under field environment conditions such as those inside a five foot deep trench, (3) the prior art connector 9 diverging alignment requires unwinding and separating individual pipes 7 from their helical arrangement for an alignment with the diverging arrangement of prior art connector 9 making an overly complicated and time consuming pipe 7 connections in the field environment, (4) the increased likelihood of field pipe 7 connection errors which can result in the erroneous routing of the heat exchange fluid through multiple pipes 7 and decreased performance of geothermal system 1. Thus, there is an inherent desire to improve the overall reliability and performance of geothermal systems 1 by moving as much of the pipe 7 connections as possible into the factory and away from the additional expenses and reduced reliability associated with field connections of pipe 7.

Pipe 7 connections under factory environmentally controlled conditions whether between various types of connectors 9 such as U-Bend and/or manifold connectors produce more reliable connections, can be more readily tested and as required economically repaired prior to arrival in the field for installation.

Undesirable added expenses related to the installation of geothermal systems 1 include the length of the trenches 6 that are required to be dug for horizontal systems, the transportation of and connection of the pipes 7 at the installation site, and bore hole complications. Pipes 7 can include straight, semi-rigid and/or rigid pipes that have multiple limitations that include the transportation of long sections of pipe 7 and the manual labor required to unload, position, and connect the multiple extended length of pipes 7. Similarly the overcoming of unfavorable bore hole conditions such as outcroppings and irregularities in the bore hole walls that cause geothermal systems 1 to hang up, for example, and water in the bore hole require specialized adaptions of weight to overcome.

The ideal geothermal system 1 is one that is produced, assembled, or preassembled in a factory environment for the reliability of the connections, is sufficiently flexible that it can be coiled into a compact arrangement for transportation, can be installed on site with a minimal number of pipe 7 connections in the field, and has the ability to be installed on site with the needed stiffness, protective coverings, and weight for geothermal system 1 to overcome the unfavorable bore hole conditions such as those identified herein above.

A new compact manifold connector 9 and new approaches to stiffen and add weight to the geothermal system 1 during installation in the bore hole are needed. The new compact manifold connector is needed for a compact helical arrangement of pipes 7 that does not diverge pipes 7 on different angles and combines the heat exchange flow of multiple pipes 7 in a bore hole 8 in a singular alignment with central conduit for connection to a larger diameter supply pipe 4A and/or return pipe 4B. The new approaches overcome unfavorable bore hole conditions during the installation of geothermal system 1 in a bore hole include for example the shielding of the distal end portion of the geothermal system 1, an elongate and stiff weight located in the distal end portion of the geothermal system 1 that can overcome bore hole outcroppings and irregularities while staying aligned with the bore hole and penetrate through water to the bottom of the bore hole.

Heretofore there has not been a high efficiency compact and flexible arrangement of multiple pipes 7 for geothermal heat exchange that has been assembled in the factory, can be coiled for ease of transportation, uncoiled on site, installed pre-assembled into a bore hole with at least one fitting connected to a plurality of pipes and to lengths of primary pipes 4 and connected to the central conduit below grade in the bore hole, the fitting having a dimensional fit and form design for positioning in the borehole and the lengths of the primary pipes 4 extending from the borehole for connection directly to supply pipe 4A and return pipe 4B for geothermal heat exchange that further includes a stiff weight in the assembly and/or the ability to partially disassemble the geothermal system 1 at the installation site to install a desired type and amount of weight 100 into the distal end portion of the geothermal system 1 to overcome unfavorable bore hole conditions.

SUMMARY OF THE INVENTION

The present disclosure is a novel structure of a geothermal heat exchange apparatus wherein the geothermal heat exchange apparatus is preassembled in a factory for installation into a bore hole and connection with the primary pipe for supply and the primary pipe for return of the heat exchange fluid. Specifically, the geothermal heat exchange apparatus includes the twisting of a plurality of pipes onto a central conduit and the connection of manifold fittings to the plurality of pipes in a compact minimum diameter form that can be inserted into a borehole. It is understood that while it is preferred to minimize the diameter of the borehole, there are applications in which the minimum diameter borehole is not necessarily the most desired or preferred approach for heat exchange. It can also be desirable to drill the borehole to a desired diameter vice the minimum diameter for the installation of the compact geothermal heat exchange apparatus. The pre-assembled structure of the geothermal heat exchange apparatus makes more efficient use of the borehole space by placing more pipe and at least one manifold fitting into the borehole in a compact spaced arrangement for heat transfer. The unique structural arrangement of the geothermal heat exchange apparatus creates additional surface area for heat transfer surface through flexible thin-walled pipes in a small diameter borehole. The twisted plurality of pipes is wrapped in helical arrangement that is in contact with the central conduit such that the interface between the plurality of pipes and the central conduit bind the plurality of pipes into a fixed position on the central conduit. In addition, bands or straps can be used to further connect the plurality of pipes on the central conduit. This structural arrangement also provides support for retaining the relative position of each pipe during installation in a relatively tight borehole. The flexible nature of the central conduit and the plurality of pipes in a twisted arrangement is easily coiled and transported in a roll to a job site.

An arrangement of flexible pipes for geothermal heat exchange is described that comprises a central conduit and a plurality of pipes. The central conduit has a tubular structure that includes a first end portion and an opposed second end portion. The central conduit defines an aperture in the first end portion that is aligned with the longitudinal axis of the central conduit and extends the first end portion and the second end portion.

Each pipe of the plurality of pipes has a first end portion and an opposed second end portion. Each pipe has a tubular structure that preferably has a circular cross-section. The plurality of pipes is twisted around the central conduit in an approximately parallel arrangement and in an approximately fixed spaced separation that defines a gap between adjacent pipes. Each pipe of the plurality of pipes is positioned in direct contact with the central conduit. The second end portion of each pipe of the plurality of pipes is connected to a joint. The joint receives and redirects the flow from at least two supply pipes of the plurality of pipes to at least two return pipes of the plurality of pipes. The geothermal heat exchange apparatus is flexible and is coilable or can be coiled into a roll. The first end portion of each pipe of the plurality of pipes is adapted to connect to the at least one fitting and the at least one fitting connects through the primary pipes to an external environmental control system for the transfer of a liquid that is a heat exchange medium through the plurality of pipes. The plurality of pipes provides an extended arcuate pathway for the exchange of heat between the liquid and the earth. The external environmental control system at least includes heating and/or cooling.

The geothermal heat exchange apparatus is structured and pre-assembled for installation in a borehole. The geothermal heat exchange apparatus or apparatus includes a pre-assembled plurality of pipes in a twisted arrangement around a central conduit for geothermal heat exchange and connection to the primary pipes that provide fluid flow to the heat pump. The apparatus in one preferred embodiment comprises a central conduit, a plurality of pipes, at least one fitting and a joint. The central conduit or conduit has a first diameter, a first end portion that includes a first terminal end, a second end portion that is opposed to the first end portion, and the second end portion includes a second terminal end. The central conduit includes a center portion of that is continuous with and in fluid communication with the first end portion and the second end portion. The first end portion, central portion and second end portion define a through aperture that extends the length between the first terminal end and the second terminal end. The central conduit is flexible.

Each pipe of the plurality of pipes has a first end portion, a center portion and an opposed second end portion. The first end portion is aligned with the central conduit and includes a first terminal end. The center portion is in direct contact with and has a helical arrangement around the central conduit. The center portion of the plurality of pipes is in fluid communication with the first end portion and the second end portion of the plurality of pipes. The second end portion of the plurality of pipes is aligned with the central conduit and includes a second terminal end. Each pipe defines an aperture that extends the length between the first terminal end and the second terminal end of the pipe. Each pipe of the plurality of pipes is flexible. The second end portion of the plurality of pipes is at least partially in direct contact with the central conduit. The plurality of pipes is bound to the central conduit by the helical arrangement. Bands can be used to further fix and bind the plurality of pipes to the central conduit. The plurality of pipes includes at least two pipes that are supply pipes and at least two pipes that are return pipes. Each pipe of the plurality of pipes has a second diameter that is less than the first diameter. The first end portion of each pipe of the plurality of pipes is connected to one fitting and the second end portion of each pipe of the plurality of pipes is connected to the joint.

The at least one fitting is a manifold connector. Each fitting has a first end portion that includes a first aperture and an opposed second end portion that includes at least two second apertures. The first aperture connects to a primary pipe and the at least two second apertures connect to at least two pipes of the plurality of pipes. The first aperture has a straight alignment and is in fluid communication with the first end portions of the at least two pipes. The at least two second apertures and first aperture of the at least one fitting and the second end portion of the at least two primary pipes connect in the first straight alignment. The first straight alignment is aligned with the central conduit. The at least one fitting is in direct contact with, connected to and is fixed in position on the first end portion of the central conduit. The first end portion of the central conduit extends beyond the at least one fitting.

The joint as defined herein can include one or more sub-assemblies such as fittings, connectors, and U-bends. The joint includes a first end portion and an opposing second end portion. The first end portion of the joint connects to the second end portion of the plurality of pipes. The joint provides fluid communication from the at least two pipes that are supply pipes of the plurality of pipes to at least two pipes that are return pipes of the plurality of pipes.

The at least one fitting of the apparatus can be further defined as at least two fittings or two fittings. In this preferred embodiment, each fitting is an identical manifold connector. Each fitting has a first terminal end and an opposed and aligned second terminal end. The first terminal ends of the fittings connect to one of the supply or return primary pipes and the second terminal ends of the fittings connect to the second terminal ends of at least two of the plurality of pipes that are supply pipes and at least two of the plurality of pipes that are return pipes.

Alternatively, the at least one fitting can be a single manifold connector. The single fitting embodiment is in fluid communication with one primary pipe that is a supply pipe and one primary pipe that is a return pipe. The fitting is also in fluid communication with at least two pipes of the plurality of pipes that are supply pipes and at least two pipes of the plurality of pipes that are return pipes. The single fitting is configured for connection to the first end portion of the central conduit and positioning in the bore hole.

The joint in one embodiment includes two fittings. A second terminal end of the first fitting connects to the at least two pipes of the plurality of pipes that are supply pipes and a second terminal end of the second fitting connects to at least two pipes of the plurality of pipes that are return pipes. A first terminal end of each fitting connects to one of the terminal ends of a U-bend. The U-bend connects the plurality of pipes that are supply pipes to the plurality of pipes that are return pipes.

The joint in another embodiment includes at least two fittings. The second end portions of the fittings connect to at least two pipes of the plurality of pipes that are supply pipes and at least two pipes of the plurality of pipes that are return pipes. The first end portions of the fittings are capped to terminate the fluid flow through the first aperture and redirect the fluid flow between the two pairs of at least two pipes of the plurality of pipes.

The joint with at least two fittings can include the positioning of each fitting in a staggered arrangement along the central axis of the apparatus or in a tandem arrangement on opposing sides of the central axis of the apparatus.

The joint can also be a manifold connector that includes a first end portion and an opposed second end portion. The first end portion connects to and is in fluid communication with the second terminal ends of the plurality of pipes. The second end portion includes a reservoir that is in fluid communication with at least two pipes that are supply pipes and at least pipes that are return pipes. The arrangement of the joint as a single assembly that includes a common reservoir simplifies the assembly of the apparatus because the reservoir is common to the supply inputs and return outputs of the plurality of pipes and individual pipes cannot be incorrectly connected to the joint.

BRIEF DESCRIPTION OF THE DRAWINGS

FIG. 12 is an idealized side and second end portion perspective view of an alternative embodiment of the joint of the geothermal heat exchange apparatus of FIG. 2 showing the connection of the terminal end of the joint with the second terminal ends of each pipe of the plurality of pipes;

FIG. 13 is an alternative embodiment of the joint of FIG. 12 in which the apertures that connect to the second terminal ends of each pipe of the plurality of pipes are positioned in two rows;

FIG. 14 is an alternative embodiment of the joint of FIG. 12 in which the apertures that connect to the second terminal ends of each pipe of the plurality of pipes are positioned in three rows;

DETAILED DESCRIPTION OF THE INVENTION

Figure 1:
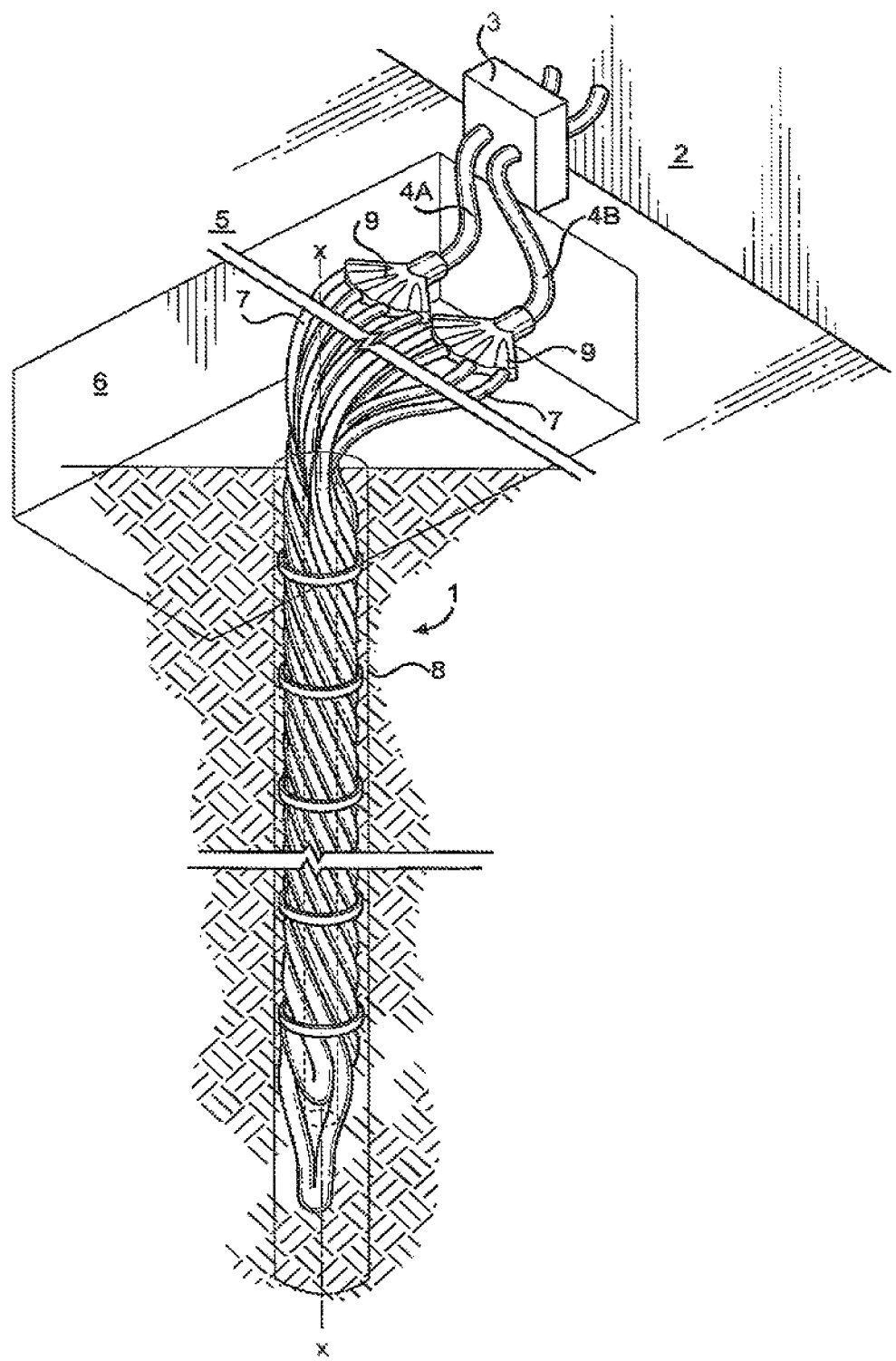
FIG. 1 is a perspective view of an idealized prior art environmental control system that uses a helical arrangement of a plurality of pipes and a prior art connector in a trench for connection to the primary pipes for geothermal heat exchange.
Figure 2:
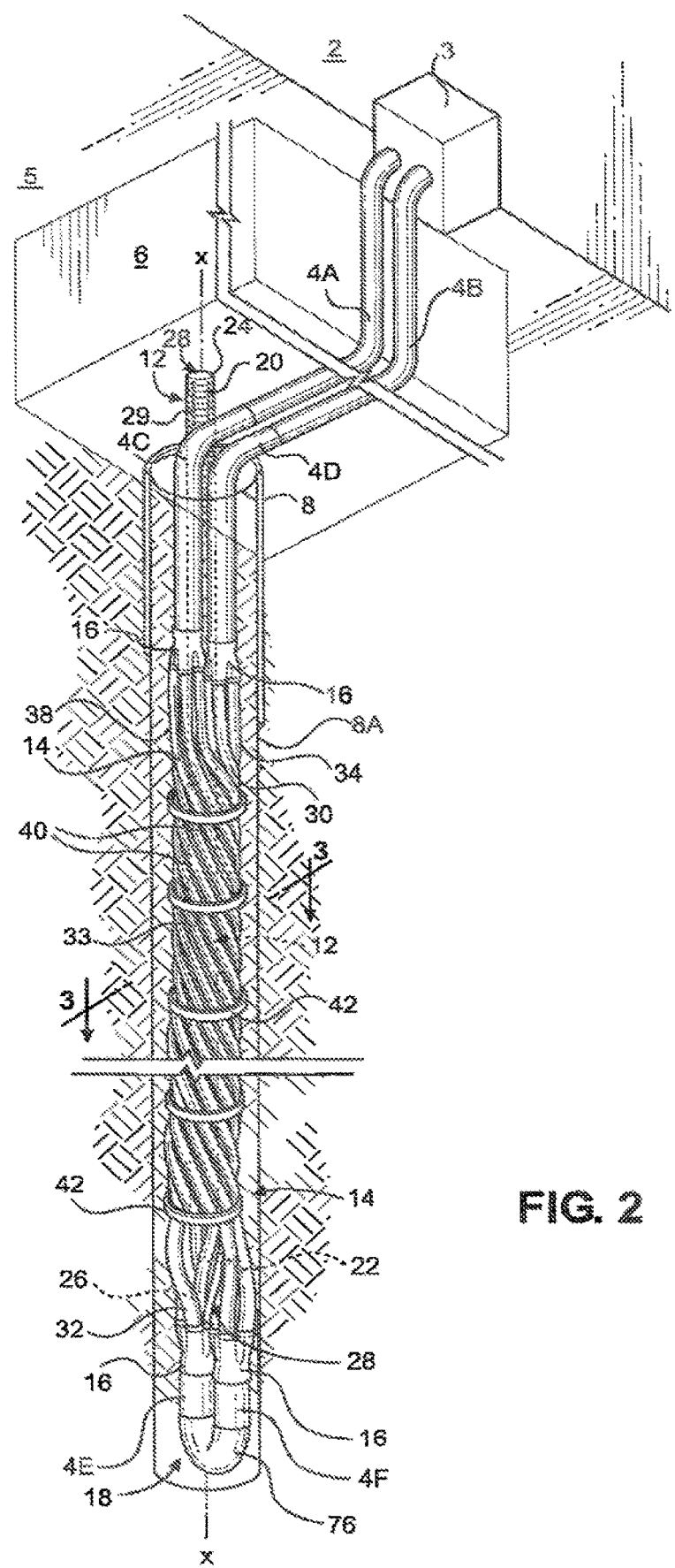
FIG. 2 is a side perspective partial cut-away view of the geothermal heat exchange apparatus of the present disclosure positioned in a bore hole that includes a fitting positioned below grade and in the bore hole and an extension of primary pipe extending from the fitting from the bore hole.

Referring initially to FIG. 2, geothermal heat exchange apparatus 10 has a tubular shaped overall structure defined by the combination of a central conduit 12 and a helical arrangement of a plurality of pipes 14 around the central conduit 12. The geothermal heat exchange apparatus 10 includes the central conduit 12, plurality of pipes 14, at least one fitting 16 and at least one joint 18. The plurality of pipes 14 is twisted onto central conduit 12 in the helical arrangement for the exchange of heat. The at least one first fitting 16 connects to the plurality of pipes 14 and to at least two primary pipes 4A and 4B. The at least two primary pipes 4A and 4B are connected to at least one fitting 16 for fluid communication with heat pump 3. The at least one joint 18 connects the plurality of pipes 14 to form a continuous loop for geothermal heat exchange. Geothermal heat exchange apparatus 10 or apparatus 10 defines a first longitudinal axis-X aligned with the centerline of central conduit 12. The elongate shape of the geothermal heat exchange apparatus defines a proximal direction as being from the at least one joint 18 to the at least one fitting 16 and the distal direction to be from the at least one fitting 16 to the at least one joint 18.

Figure 3:
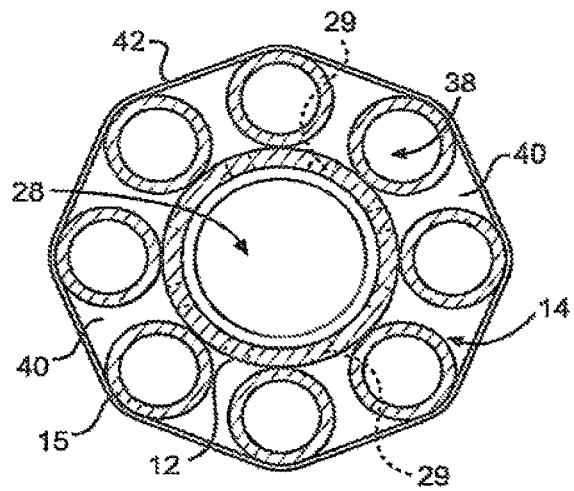
FIG. 3 is an idealized top view taken along lines 3-3 of geothermal heat exchange apparatus of FIG. 2.

As shown in FIGS. 2 and 3, central conduit 12 is a standard tubular conduit. Central conduit 12 or conduit 12 has a flexible structure that includes a first end portion 20 and a second end portion 22. The first end portion 20 and second end portion 22 are opposed. First end portion 20 defines a first terminal end 24 and second end portion 22 defines a second terminal end 26. Central conduit 12 defines an aperture 28 that extends between the first terminal end 24 and second terminal end 26. Aperture 28 is a through hole that extends the length of central conduit 12. In one preferred embodiment, the dimensions of central conduit 12 include an inside diameter of approximately one and nine-tenths (1.9) inches, outside diameter of approximately two and four-tenths (2.4) inches and a tubular wall thickness of approximately six hundred twenty five thousandths (¹⁄₁₆th or 0.0625) inches.

Central conduit 12 preferably has corrugated tubular walls that enhance the ability of central conduit to flex and form a circular or coiled shape. It is understood that the dimensions of the central conduit can vary depending upon the intended geothermal heat exchange application. The tubular wall of central conduit 12 can be solid or include a plurality of apertures 29. The shape of apertures 29 is shown as being circular, but it is understood that apertures 29 can have any shape and/or directional alignment suitable for facilitating the flow of a material such as grout 92 from conduit 12 through apertures 29. The central conduit 12 is not in fluid communication with the plurality of pipes, The plurality of pipes 14 includes a first end portion 30, an opposed second end portion 32 and a central portion 33. The first end portion 30 of the plurality of pipes when positioned in bore hole 8 is below grade 5, the center portion includes the helical twisting arrangement and the second end portion 32 is in proximity to the terminal end of the bore hole 8. In this preferred embodiment, the geothermal heat exchange apparatus 10 has a proximal end portion that includes at least one fitting 16, the first end portion 30 of the plurality of pipes 14, and the first end portion 20 of the central conduit 12 and a distal end portion that includes the at least one joint 18, second end portion of the plurality of pipes 32 of the plurality of pipes 14, and second end portion 22 of central conduit 12.

Each pipe 15 of the plurality of pipes 14 has a flexible tubular structure that includes a first end portion 30 and an opposed second end portion 32. First end portion 30 includes a first terminal end 34 and second end portion 32 includes a second terminal end 36. The first terminal end 34 and second terminal end 36 define an aperture 38 that is a through hole that extends the length of each pipe 15. The diameter of aperture 38 of pipe 15 can vary depending upon the intended heat exchange application. In one preferred embodiment, individual pipes 15 of the plurality pipes 14 are standard ¾ or 0.75 inch inside diameter pipes 15 with a standard wall thickness of approximately 0.078 inch. The inside diameter and wall thickness of each pipe 15 of the plurality of pipes 14 is varied to accommodate the liquid flow and/or heat exchange demand for a given application. Primary pipe 4 preferably has an interior diameter of one and one-quarter (1.25) inches, but it is understood that the diameters of pipes 15 and primary pipe 4 can vary depending upon the application of geothermal heat exchange apparatus 10.

Geothermal heat exchange apparatus 10 is structured for positioning in a bore hole 8. The diameter and length of bore hole 8 and apparatus 10 can vary depending upon its intended application for heat exchange. In this one preferred embodiment, bore hole 8 has a six (6) inch diameter and apparatus 10 includes eight (8) pipes 15 that are wound around conduit 12 in the helical arrangement. The function of the helical arrangement of the eight (8) pipes 15 can vary, but the plurality of pipes 14 typically includes four (4) supply pipes 15 and four (4) return pipes 15. One common length of apparatus 10 is approximately 300 feet.

The materials of construction of the plurality of pipes 14 and fluid flow therein are controlled by local ordinances, building codes and environmental laws. In this preferred embodiment, the plurality of pipes 14 is made from a high-density polyethylene (HDPE) material. It is understood that the plurality of pipes 14 can be made from other materials that satisfy the local ordinances, building codes and environmental laws of the different legal jurisdictions.

Each pipe 15 of the plurality of pipes 14 is twisted onto and around the central conduit or conduit 12 in a parallel, spaced, and twisted arrangement. Twisted onto as defined herein includes positioning the plurality of pipes 14 in direct contact with central conduit 12 in a helical arrangement. In the preferred embodiment the plurality of pipes 14 is positioned in an approximately parallel helical arrangement around the central conduit 12. Each pipe 15 of the plurality of pipes 14 is fixed in position in direct contact with central conduit 12 and has a space or a gap 40 between pipes 15. Each pipe 15 of the plurality of pipes 14 is positioned in approximate fixed spaced separation on central conduit 12 relative to the adjacent pipe 15 of the plurality of pipes 14. Individual pipes 15 of the plurality of pipes 14 can vary in their respective inside diameters, their length, the quantity of pipes 15 in the plurality of pipes 14 and the arrangement of pipes 15 on central conduit 12 depending upon the intended application of geothermal heat exchange apparatus 10. For example, in one preferred embodiment, plurality of pipes 14 includes a total of eight (8) pipes 15 in a twisted arrangement around the conduit 12. While this embodiment as shown includes four (4) pipes 15 that are supply pipes and four (4) pipes 15 that are return pipes, alternative embodiments of apparatus 10 can include two (2) pairs of pipes 15 with one (1) pair of pipes 15 being supply pipes 15 and the one (1) pair of pipes 15 being return pipes 15 or six (6) supply pipes 15 and six (6) return pipes 15.

The first end portion 30 and the second end portion 32 of the plurality of pipes 14 on central conduit 12 include a transition from the helical arrangement to a straight alignment with the central conduit and axis-X. The length of the straight alignment of the plurality of pipes 14 in first end portion 30 and second end portion 32 can vary, but is preferably three (3) to four (4) feet due primarily to the stiffness of pipes 15 and due to the straight length of pipe required to properly fuse the fitting onto the pipes. A straight alignment with each pipe 15 into each fitting 16 and primary pipe 4A or 4B is required because of the dimensional, form and fit limitations necessitated by the positioning of fittings 16 on conduit 12 that will be located in the six (6) inch diameter bore hole 8. The straight alignments of pipe 15, fitting 16, joint 18 and primary pipe 4 also make a less complex and more reliable connection.

Figure 4:
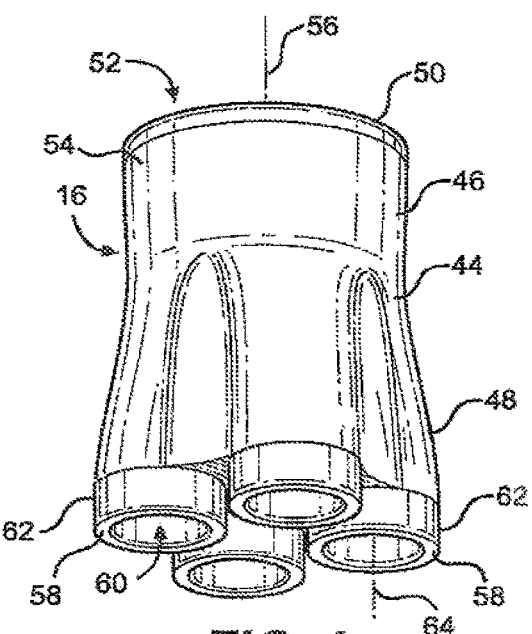
FIG. 4 is a side and second end portion perspective view of the fitting of the geothermal heat exchange apparatus of FIG. 2.

Referring now to FIG. 4, fitting 16 is a non-standard and unique manifold connector specifically dimensioned for positioning in bore hole 8 (See FIG. 2). In this one preferred embodiment, fitting 16 is a four (4) to one (1) manifold connector. Fitting 16 includes a housing 44, a first end portion 46 and a second end portion 48 that is opposed to the first end portion 46. First end portion 46 has a first terminal end 50 and first terminal end 50 defines a first aperture 52. Tubular wall 54 defines a center 56 of first aperture 52. Second end portion 48 includes a plurality of second terminal ends 58 that define a plurality of second apertures 60. Second end portion 48 preferably includes a plurality of short tubular extensions 62 that extend as cantilevered tubes from housing 44 to second terminal ends 58. Each second apertures 60 defined in second terminal ends 58 extends through tubular extension 62 and is in fluid communication with first aperture 52. Each second aperture 60 is circular and defines a center 64.

Figure 5:
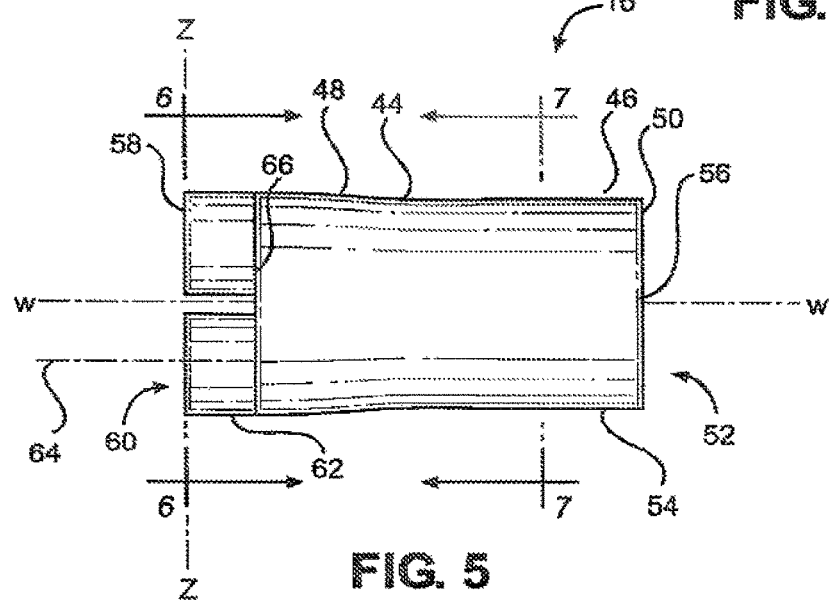
FIG. 5 is a side view of the fitting of the geothermal heat exchange apparatus of FIG. 2.

As shown in FIG. 5, first end portion 46 includes tubular wall 54 and that defines first aperture 52. The center 56 of first aperture 52 defines a centerline of fitting 16 housing 44 and also defines an axis-W. An axis-Z is perpendicular to, intersects axis-W and is aligned with the plurality of second terminal ends 58. Tubular extensions 62 have an abbreviated length beyond housing 44. Centers 64 that are also centerlines of tubular extensions 62 are aligned with axis-W.

Figure 6:
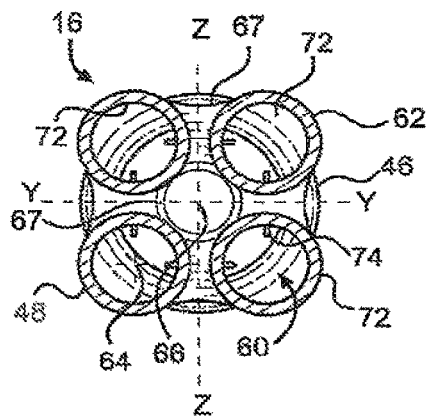
FIG. 6 is a view taken along lines 6-6 of the second end portion of the fitting of the geothermal heat exchange apparatus of FIG. 2.

Referring now to FIGS. 5 and 6, an axis-Y is aligned with the plurality of second terminal ends 58 and is perpendicular to axis-Z. A plane Y-Z is defined by the intersection of the axis-Y and axis-Z. Plane Y-Z is aligned with the plurality of second terminal ends 58 and is parallel to the first terminal end 50. Axis-W extends through the first end portion 46, center 56 of first aperture 52, through housing 44 and an axial center 66 of second end portion 48. Tubular extensions 62, apertures 60 and centers 64 are aligned with axis-W. Plane Y-Z is perpendicular to axis-W.

Second end portion 48 tubular extensions 62 are connected to their respective adjacent tubular extensions 62 by structural walls 67. In this preferred embodiment each tubular extension 62 is connected by two structural walls 67 that include outer structural walls 67 and the inner structural wall 67. The outer structural walls 67 are contiguous with housing 44 and extend between adjacent tubular extensions 62. The inner structural walls 67 connect adjacent tubular extensions 62 in a region in proximity to axial center 66 and/or axis-W.

As shown in FIGS. 4-6 in this one preferred embodiment, fitting 16 is a four (4) to one (1) manifold connector that includes four (4) pipes 15 to one (1) primary pipe 4 (See FIG. 2). The four (4) second apertures 60 each have centers 64 that define the corners of a square arrangement of second apertures 60 and tubular extensions 62. The width between the outer edges of two adjacent second tubular extensions 62 of the second end portion 48 is greater than the outside diameter of first tubular wall 54 of first end portion 46.

Figure 7:
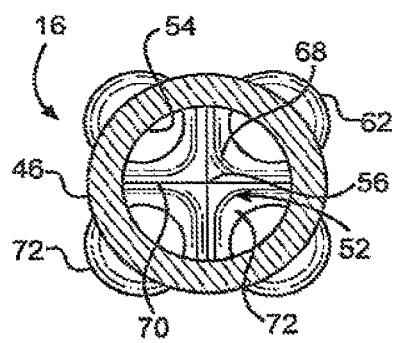
FIG. 7 is a view taken along section lines 7-7 of the first end portion of the fitting of the geothermal heat exchange apparatus of FIG. 2.

Referring now to FIG. 7 and continuing with the above preferred embodiment of fitting 16, crossed pair of support walls 68 are positioned centrally in housing 44 have tapered terminal edges 70. Crossed pair of support walls 68 or support walls 68 form a part of the inner surface of second tubular walls 72. The intersection of the support walls 68 is axial center 66. The outer surface of each second tubular wall 72 second end portion 48 extends outside of the diameter of the outer surface of first tubular wall 54 first end portion 46. As shown in FIGS. 4-7, the preferred embodiment of fitting 16 includes second apertures 60 and the initial portions of tubular walls 72 in proximity to terminal end 58 are aligned with and/or parallel to axis-W. After the initial length of second tubular walls 72, the angular alignment of second tubular walls 72 are directed within housing 44 from the centerline 64 of second aperture parallel to axis-W in inward directions towards axis-W at an angle of approximately eight and four tenths of a degree (8.4 degrees). This relatively shallow angle defines a point of convergence of the four (4) apertures 60 that extends beyond the first terminal end 50 of fitting 16 and into the interior tubular wall of the connecting primary pipe 4. The interior of housing 44 is structured to provide smooth fluid flow in both directions aligned with axis-W. For example, the support walls 68 that diverge the fluid flow from or merge the fluid flow into first aperture 52 include tapered edges 70 that are directed towards first terminal end 50 and the intersection of the support walls 68 has an approximate conical surface. Similarly, pairs of thin ridges 74 are located in proximity to and on opposing sides of the connection of each support wall 68 to the inner surface of tubular walls 72. The pairs of thin ridges 74 begin in proximity to the start of the approximately eight and four tenths degree (8.4 degrees) degree angling of second tubular walls 72 and extend past the intersection of each support wall 68 on the inner surface of each tubular wall 72. Each pair of ridges 74 is aligned with the center 64 of their respective second apertures 60 and second tubular walls 72. Ridges 74 assist in maintaining laminar fluid flow through the diverging and merging of fluid flow in housing 44. Fitting 16, in this preferred embodiment, is made from a high-density polyethylene (HDPE) material. It is understood that the fitting 16 can be made from other materials that satisfy the local ordinances, building codes and environmental laws of the different legal jurisdictions where apparatus 10 is installed.

It is understood that while fitting 16 is shown as four (4) to one (1) manifold connector, fitting 16 can vary the external shape of housing 44 and have increased numbers of second apertures 60 and first apertures 52 for different applications. For example, fitting 16 second end portion 48 can include at least four apertures 60 and first end portion 46 can include two (2) first apertures 52 for connection to two (2) primary pipes 4A for supply and 4B for return.

The connections between the plurality of pipes 14 first terminal ends 24 and second terminal ends 26, fitting 16, primary pipes 4 and joint 18 are preferably by a hot melt butt joint type connection that is widely considered to be stable in connection qualities. Other method of connection, such as socket-type electric hot melt connection, for example. The above described hot melt butt joint can be further augmented in poor geological environments with additional layers of heat shrink material such as a tape as a sealing layer to further strengthen the connection.

Figure 8:
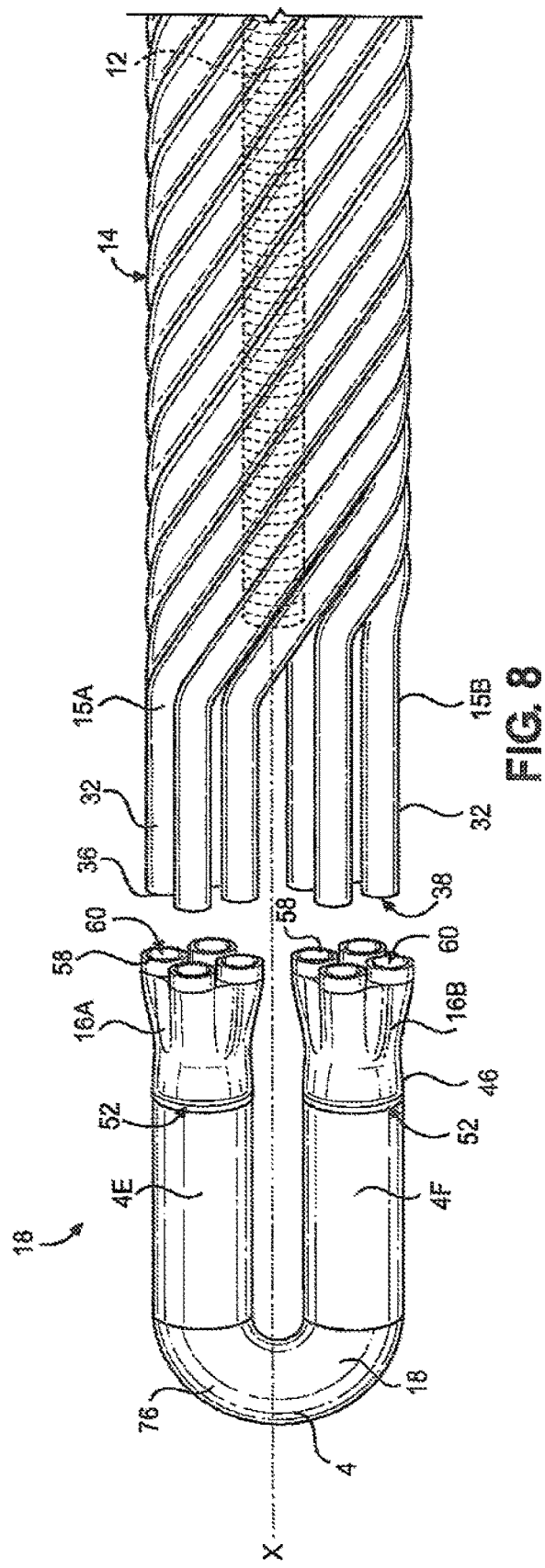
FIG. 8 is an idealized side view of the second end portion of the plurality of pipes of the geothermal heat exchange apparatus of FIG. 2 and a side and second end portion perspective view of the second fittings, lengths of primary pipes and a joint, the second end portion of the pipes aligned for connection with the second fittings of the joint.

As shown in FIG. 8, in one preferred embodiment, the plurality of pipes 14 include a plurality of supply pipes 15A and a plurality of return pipes 15B. As shown for this embodiment, the second end portion 32 of four (4) supply pipes 15A and second end portion 32 of four (4) return pipes 15B respectively connect to the four (4) second terminal ends 58 on identical supply fitting 14A and return fitting 14B. The first apertures 52 of first end portions 46 of supply fitting 14A and return fitting 14B are preferably connected directly with a joint 18 or indirectly through sub-assemblies of joint 18 such as lengths of primary pipes 4E and 4F and fittings 16, for example. In this embodiment, fittings 16A and 16B are connected to lengths of primary pipes 4E and 4F, respectively. Standard U-bend 76 is sized for connection with primary pipes 4E and 4F. Primary pipe 4E connects to the first aperture 52 of supply fitting 16A and primary pipe 4F connects to the first aperture 52 of return fitting 16B. Primary pipes 4E and 4F then connect to the apertures defined in U-bend 76. This embodiment provides an advantageous use of fittings 16 for connection with primary pipe 4 as part of first end portion 30 of plurality of pipes 14 (See FIG. 2) as well as in joint 18 that connects to second end portion 32 of plurality of pipes 14.

Figure 9:
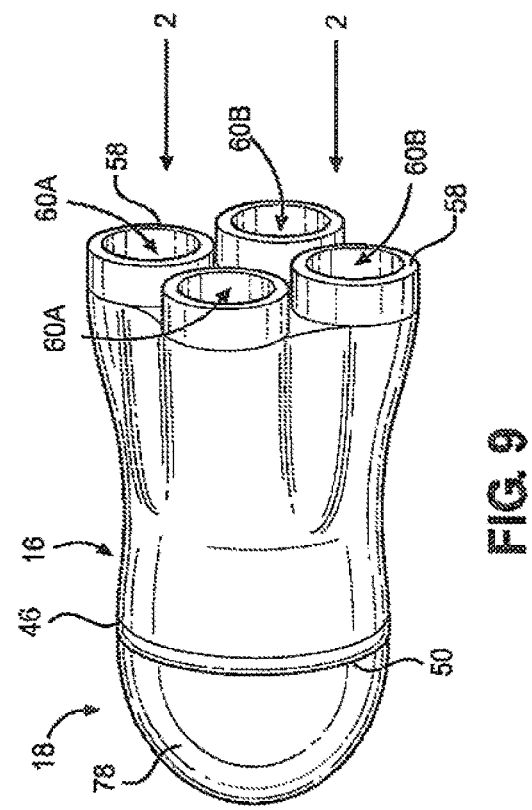
FIG. 9 is a side and second end portion perspective view of an alternative embodiment of the joint of FIG. 2 with a cap connected to the first end portion of the fitting of the joint.
Figure 10:
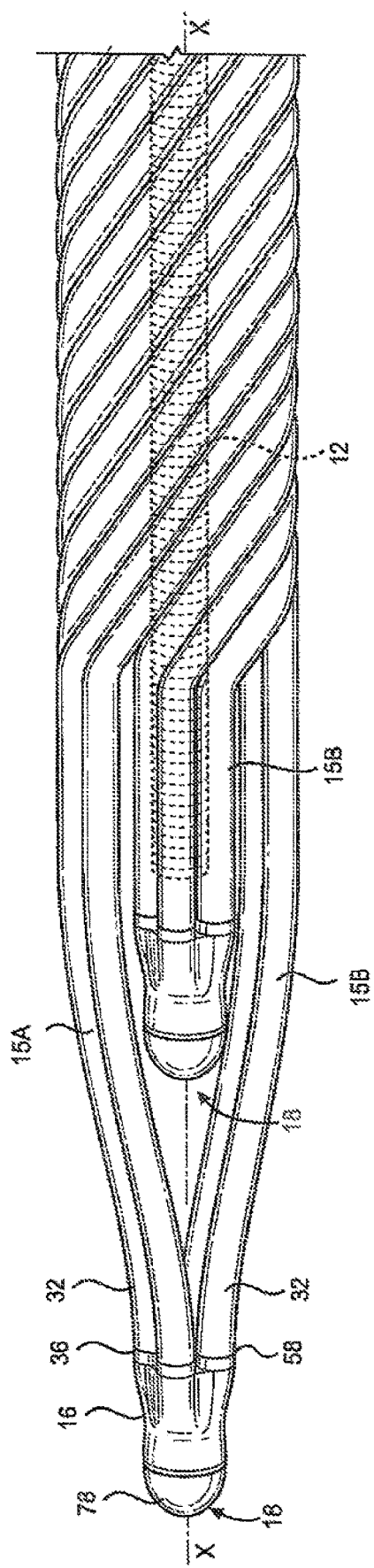
FIG. 10 is an idealized side view of the second end portion of the plurality of pipes and a side and second end portion perspective view of the joint of FIG. 9, the joint including two second fittings connected to the second terminal ends of the plurality of pipes and the two fittings staggered along axis-X.
Figure 11:
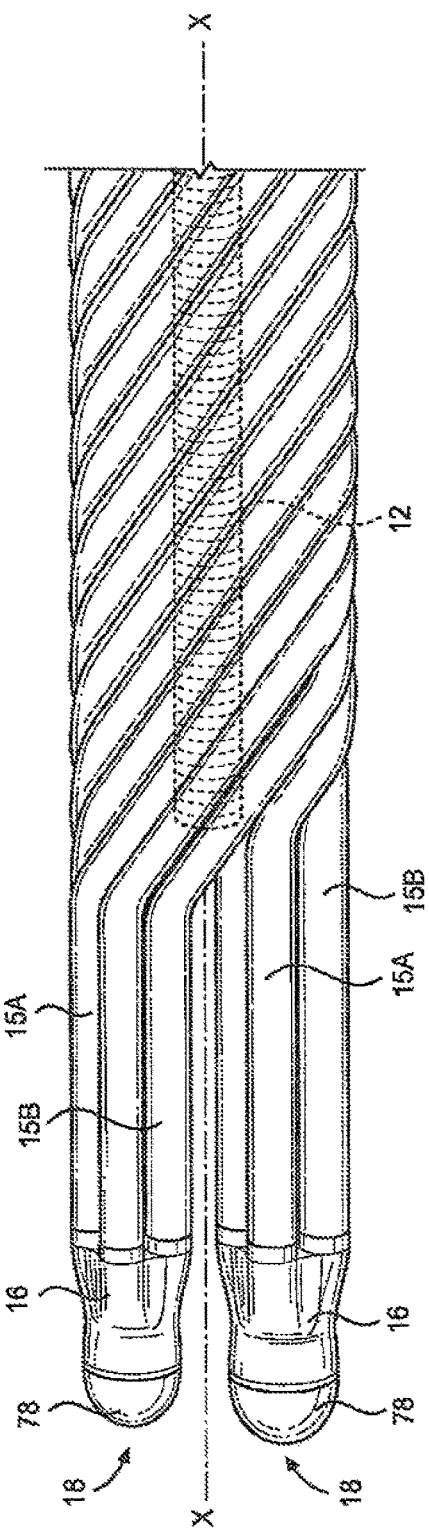
FIG. 11 is an idealized side view of the second end portion of the plurality of pipes and a side and perspective view of the joint of FIG. 9, the joint including two second fittings connected to the second terminal ends of the plurality of pipes and the two fittings positioned in tandem in a side by side on opposing sides of axis-X.

Referring now to FIGS. 9-11, in an alternative embodiment, each fitting 16 uses two (2) second apertures 60 for supply and two (2) second apertures 60 for return. First end portion 46 includes a cap 78 that secures to first terminal end 50 and closes first aperture 52 (See FIG. 7) turning fitting 16 into a variation of a U-bend connector. The two supply pipes 15A and two return pipes 15B per fitting 16 can be operationally employed to stagger fittings 16 along axis-X or alternatively in tandem or side by side on opposing sides of axis-X.

Figure 15:
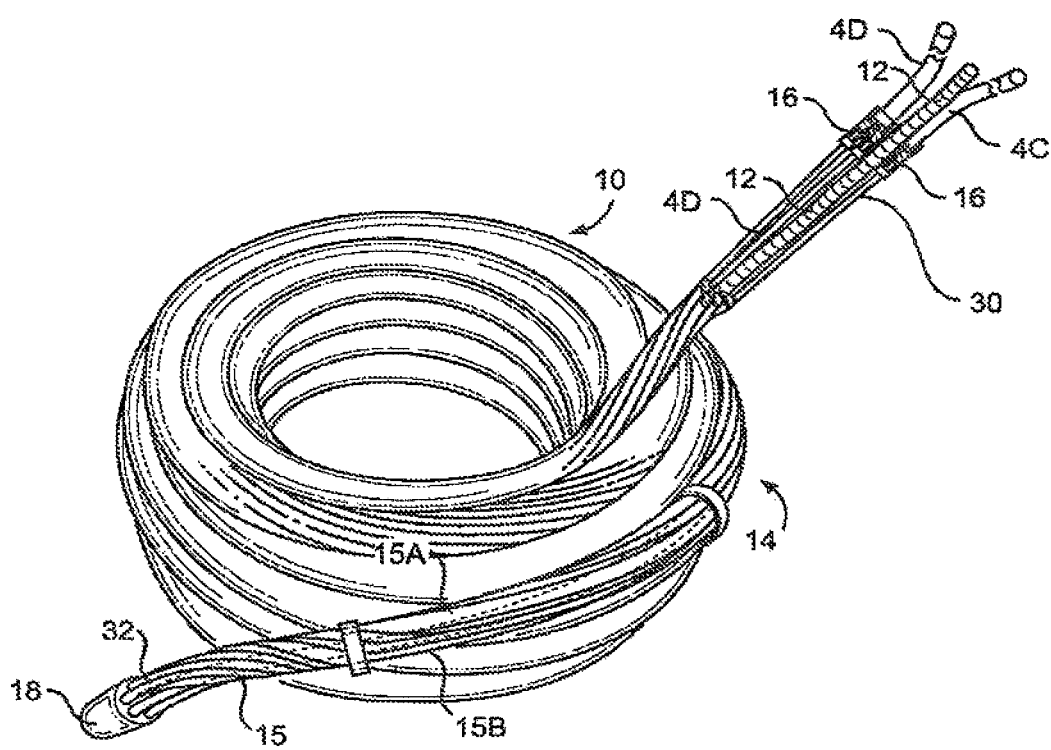
FIG. 15 is atop and side perspective view of the geothermal heat exchange apparatus of FIG. 2 coiled into a roll, the view further including a partial cut-away of the first end portion of the plurality of pipes showing the interior of the fittings and the connections to the primary pipes.

As shown in FIGS. 12-14, in another alternative embodiment, each pipe 15 connects to a single joint 18. This embodiment has the advantage that the second terminal ends 36 of pipes 15 cannot be connected to the wrong aperture 38 in fitting 16 or joint 18 or the wrong fitting 16. Joint 18 includes a housing 80, first end portion 82 and an opposed second end portion 84. First end portion 82 includes a first terminal end 86 and first terminal end 86 defines a plurality of apertures 88. The second terminal ends 36 of pipes 15 connect to the apertures 88 in terminal end 86. Apertures 88 feed into a common reservoir 90 that can vary in capacity depending upon the intended application. Joint 18 in this embodiment can have any arrangement of apertures 88 as long as apertures 88 are all connected to reservoir 90. Referring now to FIG. 15, each component of the geothermal heat exchange apparatus 10 that includes central conduit 12, plurality of pipes 14, fitting 16 and joint 18 is structured, connected and inter-related for flexibility. Thus, the fully assembled apparatus 10 can be coiled into a stack of coils for efficient storage and/or transportation. Upon arrival at an installation site, apparatus 10 can also be readily uncoiled into a linear alignment for installation down borehole 8. Apparatus 10 primary pipes 4C and 4D can be connected to the primary pipes 4A and 4B that connect to the heat pump 3 before or after installation in bore hole 8 (See FIG. 2).

Figure 16:
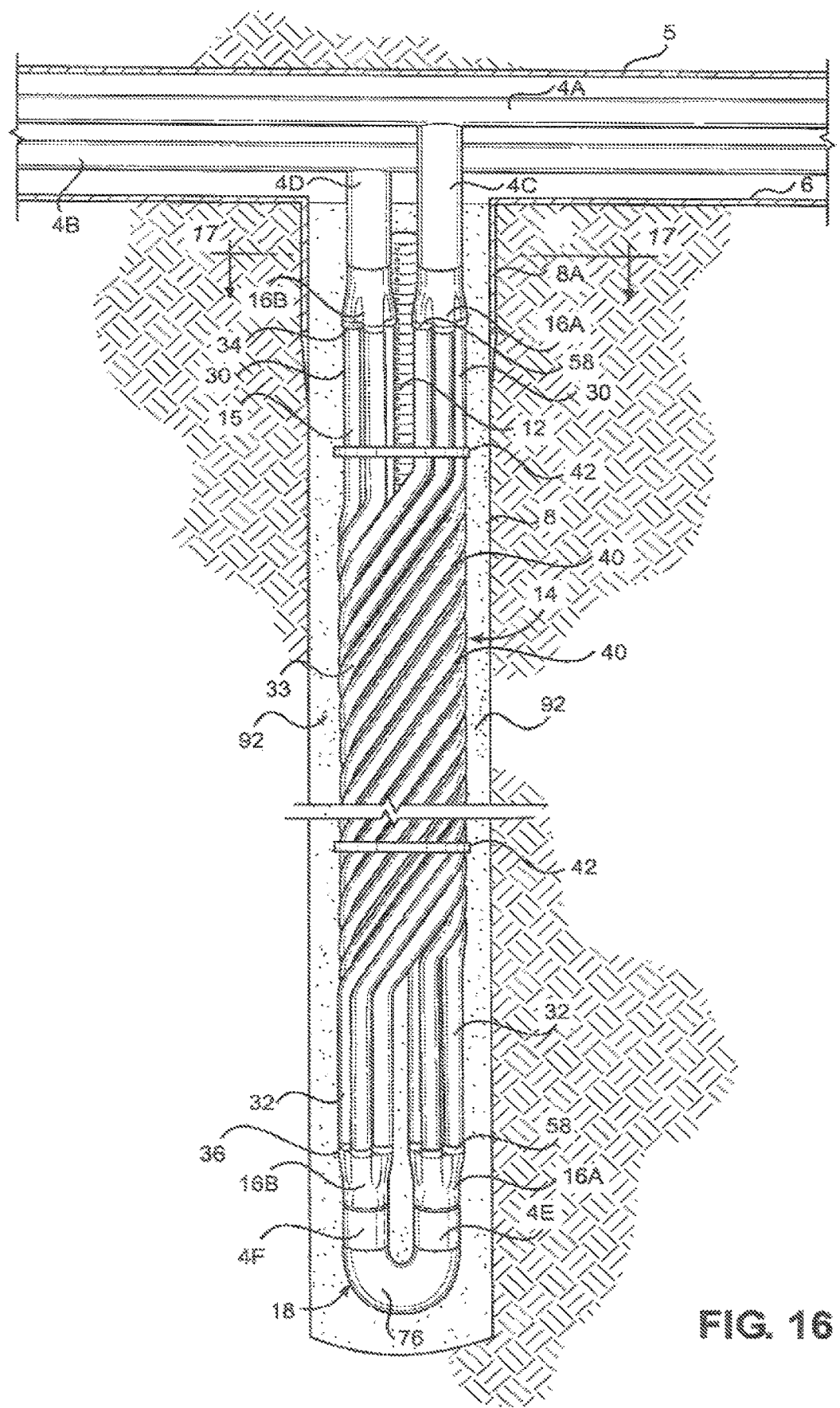
FIG. 16 is an idealized cross sectional view of the bore hole showing geothermal heat exchange apparatus of FIG. 2 in the bore hole showing the first end portion and second portion of the plurality of pipes transitioning from the helical arrangement to an arrangement parallel to the axis-X and the connections of the fittings to the plurality of pipes and the primary pipes.

As shown in FIGS. 2 and 16, geothermal heat exchange apparatus 10 is installed in bore hole 8 for operational use with primary pipes 4C and 4D connecting to primary pipe 4A and 4B, respectively. Central conduit 12 has been used as a tremie type pipe for the insertion of grout 92 or other related compounds to backfill bore hole 8. Grout 92 permeates the bore hole 8 from the bottom up as well as through apertures 29 of central conduit 12.

Figure 17:
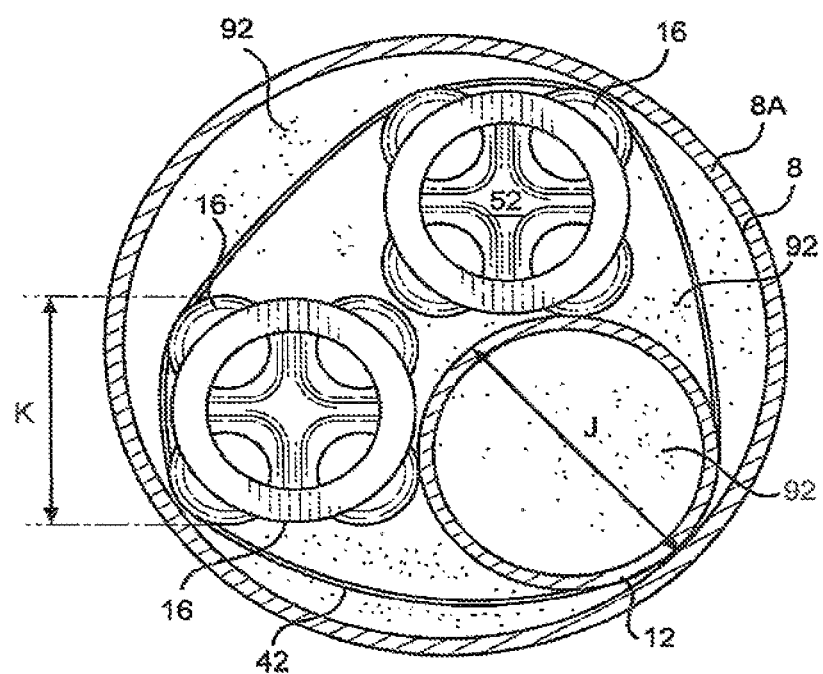
FIG. 17 is a cross-sectional view taken along lines 17-17 showing the compact arrangement of the two fittings and central conduit in the bore hole.

Referring now to FIG. 17, the dimensions of the fittings 16 and central conduit 12 require a tight fit in bore hole 8. Fittings 16 are preferably located between (2) and three (3) feet below trench 6 and within the length of the casing 8A of bore hole 8. In this one preferred embodiment of a four to one (4 to 1) fitting 16 manifold connector in a six (6) inch bore hole, the dimensions of the outside diameter J of central conduit 12 is approximately two and four tenths inches (2.4) and the width dimension of fitting 16 is approximately two and three tenths (2.3) inches and a length of approximately four and seventy-five one-hundredth (4.75) inches. In an ideal arrangement the sum of the diameter of central conduit 12 and width of fitting 16 is approximately 4.7 inches. In the worst case, the diagonal distance between diagonally opposed second apertures 60 is approximately two and seventy-five one hundredth (2.75) inches or a total of approximately five and fifteen hundredth (5.15) inches that readily fits in the six (6) inch diameter bore hole.

As shown in FIGS. 2 and 16, geothermal heat exchange apparatus 10 has been extended from the coiled position to a linear position in an approximately vertical borehole 8 in ground 6. It is understood that borehole 8 is not required to be vertical and can be angled from the vertical. Once positioned in borehole 8, an external source of grout 92 is used to supply grout 92 into central conduit 12 first aperture 25 in first end portion 20. Grout 92 is preferably pumped under pressure down conduit 12 and out through second aperture 28 in the second end portion 18 and apertures 29 in the tubular wall of conduit 12. Grout 92 surrounds the geothermal heat exchange apparatus 10 in borehole 6 through the primary loading of the grout 92 at the bottom of the borehole 8 and filling the borehole 6 vertically upward as is common practice. In addition, grout 92 advantageously passes through apertures 29 in the tubular wall of conduit 12 in the direction transverse to the longitudinal axis to assist in the filling of gaps 40 between pipes 15 of the plurality of pipes 14 that are positioned in approximately fixed spaced separation. As required for a given application, bands 34 can be applied around the plurality of pipes 14.

The relatively thin walled structure of central conduit 12 and each pipe 15 of the plurality of pipes 14 of geothermal heat exchange apparatus 10 that facilitates coiling also advantageously provides less thermal resistivity and correspondingly better heat transfer when the geothermal heat exchange apparatus 10 is installed in the earth or ground 6.

Geothermal heating exchange apparatus 10 has an advantageous level of heat transfer due to the helical twist in the plurality of pipes 14 and the creation of secondary effects in the fluid flow in the plurality of pipes 14. Secondary effects occur in curved pipes 15 as the laminate flow against the boundary layer on the inside of each pipe 15 becomes a cross flow between the inner and outer pressure gradients experienced by the heat exchange fluid in the plurality of pipes 14. The secondary flow results in elevated levels of heat transfer at relatively low Reynolds numbers in the range of 1,000 or less without the high turbulence and greater pump pressure demands required by straight pipes to achieve the approximately same level of heat transfer at Reynolds number in the range of approximately 2,500 to approximately 3,000. Further, the combination of multiple relatively small diameter pipes 15 of the plurality of pipes 14 provides for increased surface area for heat transfer.

Figure 18:
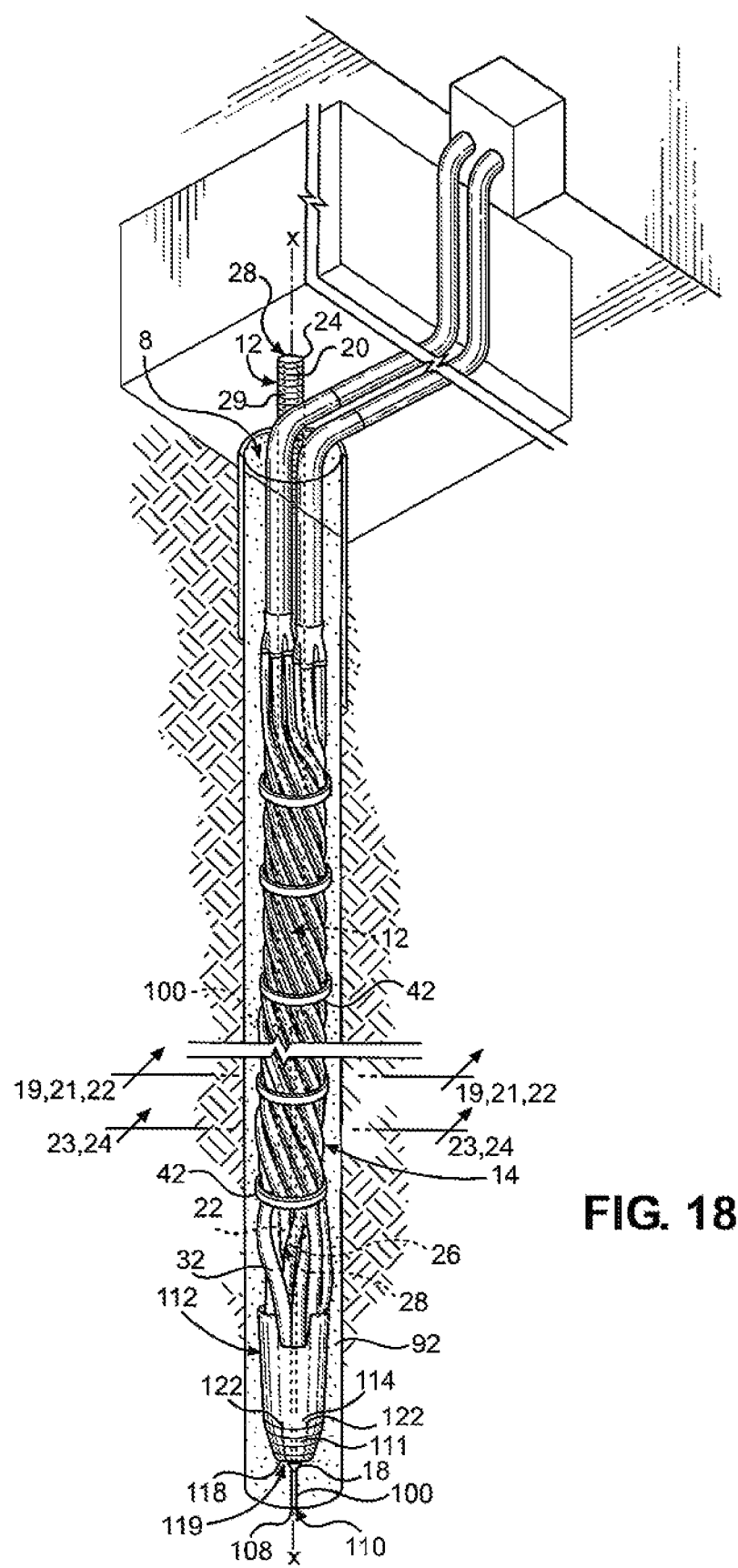
FIG. 18 is the side perspective partial cut-away view of FIG. 2 with the geothermal heat exchange apparatus of the present disclosure positioned in the bore hole and the second end portion of the plurality of pipes is connected to a plurality of joints, a sleeve is positioned over a portion of the second end portion of the plurality of pipes and the plurality of joints, and the central conduit includes a weight that extends in a distal direction from the central conduit, past the plurality of pipes, past the plurality of joints and past the sleeve in accordance with the present disclosure.

Referring now to FIGS. 2 and 18, geothermal heat exchange apparatus 10 is shown in another preferred embodiment similar to that described previously in reference to FIG. 2 for the central conduit 12, plurality of pipes 14, and at least one fitting 16. In this preferred embodiment the at least one joint 18 is a plurality of joints 18 and the geothermal heat exchange apparatus 10 further includes a sleeve 112 and a weight 100. The geothermal heat exchange apparatus 10 has a proximal end portion that includes the at least one fitting 16, the first end portion 30 of the plurality of pipes 14, and the first end portion 20 of the central conduit 12 and a distal end portion that includes the at least one joint 18, second end portion 32 of the plurality of pipes 14, sleeve 112, and weight 100. The plurality of joints 18 connects to the second end portion 32 of the plurality of pipes 14 to provide a continuous flow of the plurality of pipes 14 from the primary supply pipe 4A to the primary return pipe 4B. The sleeve 112 is a tube and is connected to the second end portion 32 of the plurality of pipes 14 and plurality of joints 18. Weight 100 is positioned in aperture 28 of the central conduit 12 and connected to the central conduit 12.

Figure 19:
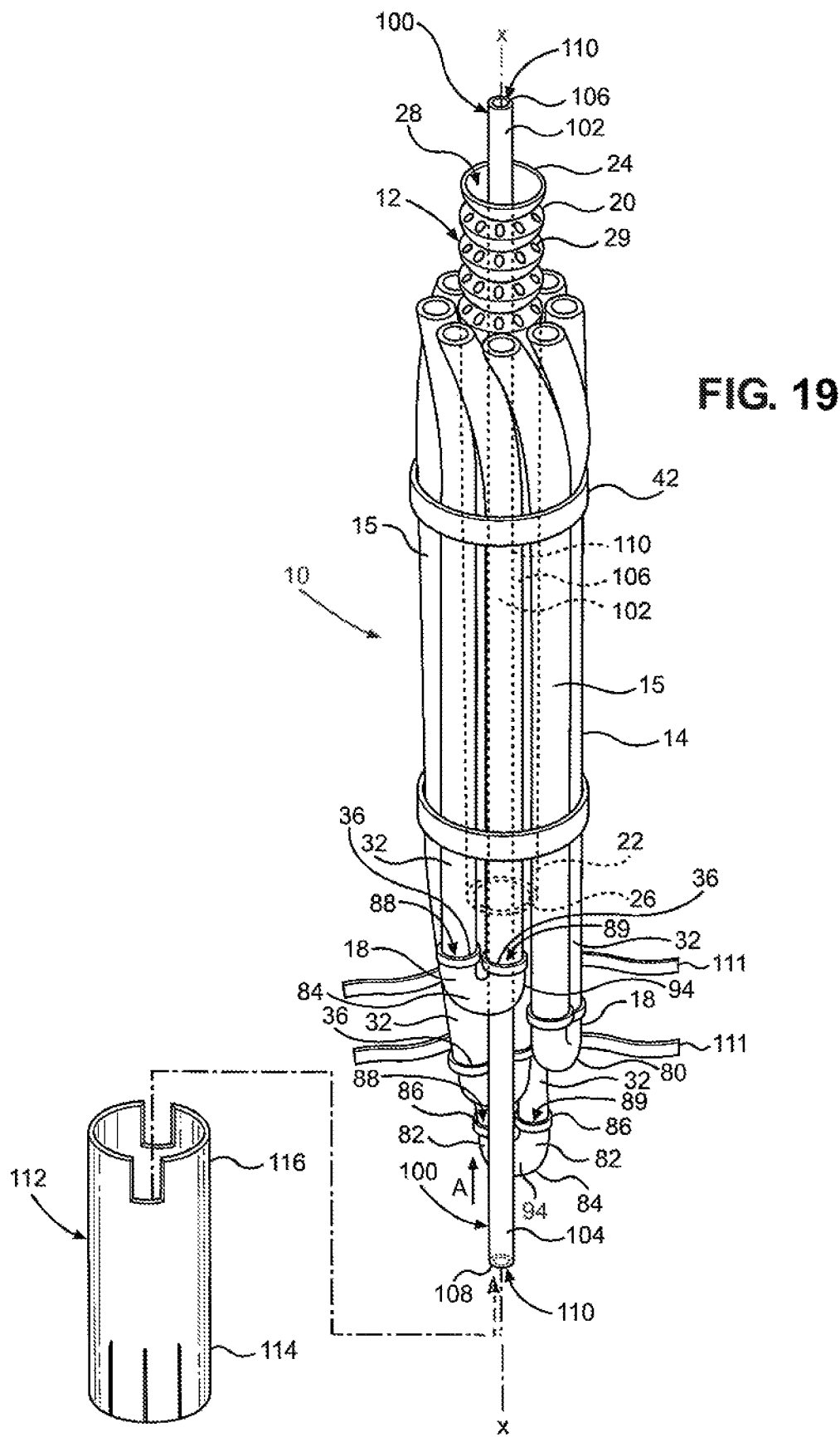
FIG. 19 is a sectional view taken along lines 19-19 of FIG. 18 showing an exploded side perspective view of the geothermal heat exchange apparatus of FIG. 18 with a vertical extension of the central conduit and the weight above the section and the sleeve separated from the second end portion of the plurality of pipes and the plurality of joints.

As shown in FIGS. 18 and 19, in this one preferred embodiment of apparatus 10, sleeve 112 is shown separate from the second end portion 32 of the plurality of pipes 14 and plurality joints 18. Each adjacent pair of pipes 15 in their helical and straight arrangements of the plurality of pipes 14 include one (1) supply pipe 15 and one (1) return pipe 15 that connect to a single (1) U-bend 18 or joint 18 of the plurality of joints 18. The adjacent pairs of pipes 15 are preferably arranged with each pair of pipes 15 having a different length such that the second terminal end 36 of each pair of pipes 15 of the plurality of pipes 14 is connected to each joint 18 in a staggered arrangement in the distal direction that is approximately aligned with longitudinal axis-X. The difference in length between adjacent pairs of pipes 15 is preferably approximately six (6) inches, but the difference in length of the staggered pairs of pipes 15 can vary depending upon the intended application of apparatus 10 and can often range over one (1) foot in length. As shown, the combination of the plurality of pipes 14 extending in the distal direction beyond the second terminal end 26 of central conduit 12 and the staggering of the lengths of the pairs of pipes 15 provides a sequential reduction in remaining number of pipes 15 of the plurality of pipes 14 and joints 18 of the plurality of joints 18. The outer dimension of the second end portion 32 of the plurality of pipes 14 and plurality of joints 18 have a distinct taper in the distal direction as the quantity of the remaining pairs of pipes 15 of the plurality of pipes 14 and joints 18 of the plurality of joints 18 is reduced to a single pair of pipes 15 and a single joint 18.

Each U-bend 18 has a housing 80 that includes a first end portion 82 and a second end portion 84. The first end portion 82 includes a first terminal end 86. The first terminal end 86 defines a first aperture 88 and a second aperture 89. The second end portion 84 includes a common pipe 94 that connects and provides fluid communication between first aperture 88 and second aperture 89. It is understood that variations of the U-bend shape of this embodiment of at least one joint 18 are encompassed herein and include a straight line and angled corner "U" shape vice a rounded "U" shape and a "V" shape, for example.

Weight 100 has an elongate shape that includes a first end portion 102 and a second end portion 104. First end portion 102 includes a first terminal end 106 and second end portion 104 includes a second terminal end 108. As shown in this one preferred embodiment, weight 100 has the structure of a pipe that defines an aperture 110 in first terminal end 106 that is a through hole that extends to the aperture 110 defined in the second terminal end 108 of weight 100.

Weight 100 is positioned in aperture 28 defined in the second terminal end 26 of central conduit 12 and connected and fixed in position in central conduit 12. Weight 100 can be positioned exclusively in aperture 28 of central conduit 12 or weight 100 can extend in the distal direction from within aperture 28 beyond second terminal end 26 of second conduit 12. As shown in this one preferred embodiment, weight 100 extends proximally in the direction of fittings 16 for a pre-determined distance from a location in aperture 28 of central conduit 12 and extends in the distal direction beyond the second terminal end 26 of central conduit 12. The extension of weight 100 in the distal direction preferably includes extending beyond the plurality of pipes 14, the plurality of joints 18, and sleeve 112 for a predetermined distance. Weight 100 is preferably fixed in position in the aperture 28 of central conduit 12 and by the connection between second end portion 32 of the plurality of pipes 14, plurality of joints 18, and sleeve 112. The dual connection of weight 100 in the central conduit 12 and the connection between weight 100 and second end portion 32 of the plurality of pipes 14, plurality of joints 18, and sleeve 112 advantageously keeps the distal end portion of the geothermal heat exchange apparatus 10 in a stiff straight alignment and with a concentrated force of weight 100 aligned with the longitudinal axis-x for penetration through bore hole 8 outcroppings, irregularities, and water to the bottom of the bore hole 8.

In this one preferred embodiment weight 100 is connected to and fixed in position in the geothermal heat exchange apparatus 10 using one or more methods that include, but are not limited to using, (1) tape 111, bands, clamps, and/or ties through apertures 29 and around weight 100, and/or using adhesives to bond weight 100 against the interior of the tubular wall of central conduit 12 and fix weight 100 relative to central conduit 12; (2) using tape, bands, ties and/or clamps around weight 100 and using tape, bands, clamps, and/or ties to strengthen the connection of a cap, plug, or cover to second terminal end 26 that closes aperture 28 of central conduit 12 and preferably still includes an opening for weight 100 to extend through and still fix weight 100 in position in aperture 28 and apertures for the passage of grout 92; and/or (3) using sleeve 112 to compress and bind the second end portion 32 of the plurality of pipes 14 and joints 18 around weight 100 and fix the location of weight 100 and second end portion 32 of the plurality of pipes 14 and joints 18 relative to the central conduit 12.

In the preferred embodiment weight 100 has the structure of one or more pieces of rebar that accommodates the flow of grout 92 around weight 100 in aperture 28 and out through aperture 28 in second terminal end 26, apertures 29 in the tubular wall of central conduit 12, and into the bore hole 8. Similarly, weight 100 can have the structure of one or more pieces of pipe that accommodate the flow of grout 92 around and through weight 100, and through apertures 28 and 29 in central conduit 12. Alternatively, weight 100 can be a solid structure that blocks the flow of grout 92 from aperture 28 of second terminal end 26 of central conduit 12. When weight 100 blocks the flow of grout 92 down central conduit 12, the plurality of apertures 29 in the tubular wall provide an adequate path for the flow of grout 92 from central conduit 12 and into bore hole 8.

The benefits of weight 100 with a pipe structure that extends beyond second terminal end 26 of central conduit 12, the plurality of pipes 14, plurality of joints 18, and sleeve 112 include the stiffness or rigidity of elongate weight 100 that connect the central conduit 12 and the second end portion 32 of the plurality of pipes 14 and the plurality of joints 18. It is understood that the length of the second end portion 32 of the plurality of pipes 14 between the second terminal end 26 of the central conduit and the joints 18 can vary from between a few feet to as much as twenty (20) or more feet. The combination of the positioning the majority of the weight 100 distal to the central conduit, approximate alignment of weight 100 with longitudinal axis, plurality of pipes 14, and the bore hole 8, and stiffness of weight 100 combine to make the geothermal heat exchange apparatus 10 down hole penetrations significantly easier by overcoming outcroppings and irregularities in bore hole 8. In addition, the locating of aperture 110 of weight 100 at the bottom of bore hole 8 provides for the flow of grout 92 to build from the bottom of bore hole 8 upwards. This has the potential to lessen the likelihood of undesirable air pockets and to uniformly force any water that may exist at the bottom upwards due to the higher density of the grout 92. As desired, the water can then be pumped from the borehole once the grout 92 has reached a desired height.

The preferred material or materials of weight 100 are denser than water. Examples of preferred materials include alone or in combination, materials such as but not limited to, metals such as steel, iron, or copper. Other materials include high-density composites, concrete or cement, and natural material such sand, rocks, stones, and/or gravel. Additional examples of the structure of weight 100 include, but are not limited to one or more of pipes, cylinders, wire, bars, rods, and tubes. Weight 100 can be a single solid cylindrical bar without aperture 110 that fills aperture 28 of central conduit 12 or a plurality of small diameter pipes or tubes that define apertures 110, or a plurality of bars that have relatively small diameters such as rebar that only partially fill aperture 28 and provide gaps or apertures 110 between the plurality of bars for the passage of grout 92.

The length and quantity of the one or more weights 100 can also vary depending upon the desired total weight of weight 100 and other factors that include the length of the second end portion 32 of the plurality of pipes 14 between the second terminal end 26 of the central conduit 12 and the plurality of joints 18, and ability of the geothermal heat exchange apparatus 10 to be stored and/or transported in a coil with weight 100 installed. The other materials noted above can similarly be contained in elongate containers that fit into aperture 28 of the central conduit and can vary from being rigid elongate canisters to flexible containers for smaller pieces of metals, high density composites, rocks, stones, sand and/or gravel that readily fit into aperture 28 of the central conduit 12 and preferably accommodate the passage of grout 92. The amount of weight 100 required for a given application of geothermal heat exchange apparatus 10 can vary depending upon factors such as the quantity of pipes in the plurality of pipes, type of joint or joints, depth of, and conditions in the bore hole 8 to include outcroppings, the stability of the bore hole 8 wall, and the presence of and depth of any water in bore hole 8. One common amount of weight 100 in applications for the present disclosure of apparatus 10 is approximately fifty (50) pounds. It is understood that the amount of weight of weight 100 required for a given application of apparatus 10 can vary as described herein above.

Figure 20:
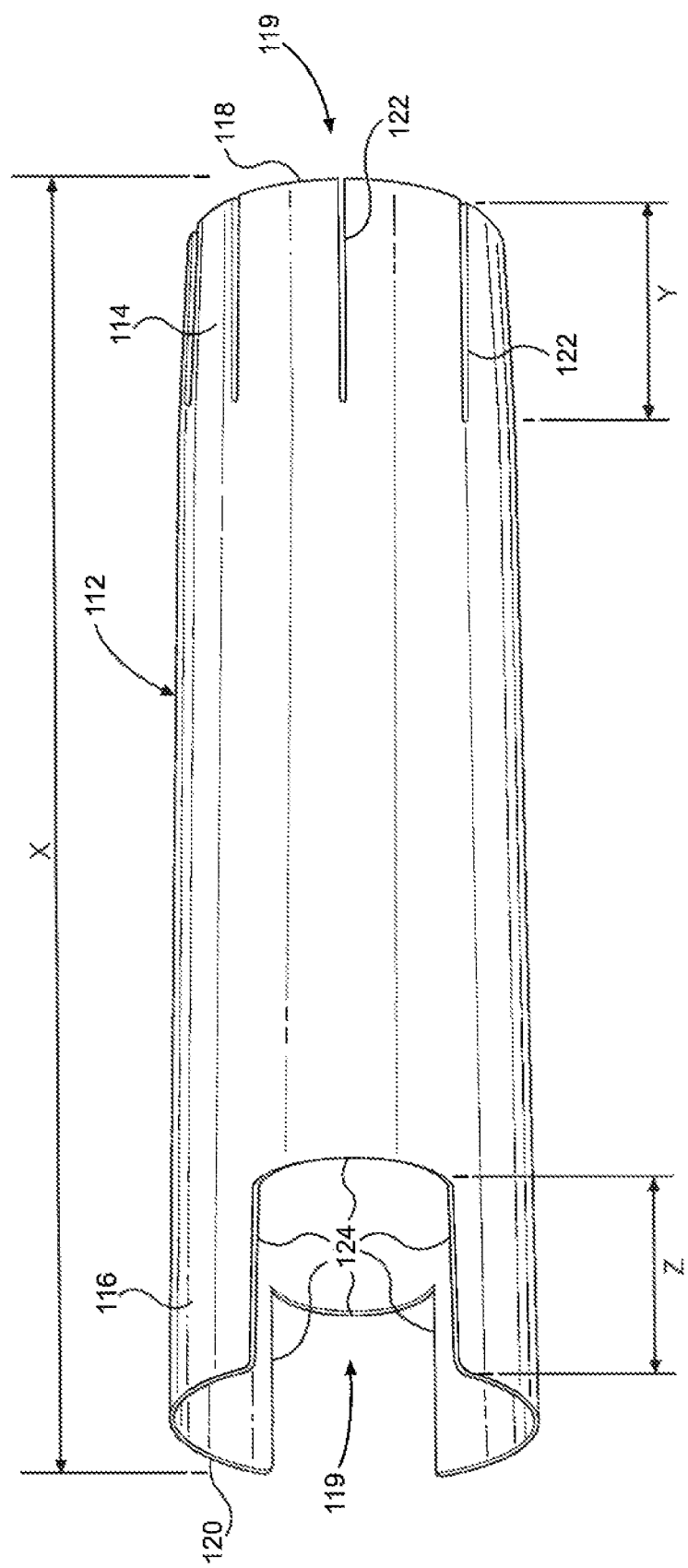
FIG. 20 is a side and top perspective view of the sleeve of FIG. 18 in accordance with the present disclosure.

Referring now to FIG. 20, sleeve 112 has the shape of a tube or pipe that includes a first end portion 114 and a second end portion 116. The first end portion 114 includes a first terminal end 118 and the second end portion 116 includes a second terminal end 120. The first end portion 114 and second end portion 116 are opposed. Sleeve 12 has a preferred length X of approximately sixteen (16) inches and the preferred outside diameter of approximately four and one-half (4.5) inches.

The first end portion 114 includes cuts 122 in the tubular wall of sleeve 112. In this preferred embodiment, first end portion 114 has eight (8) elongate cuts 122 that preferably extend a distance-Y from the first terminal end 118 towards the second end portion 116. In this one preferred embodiment, distance-Y is approximately three and one-half inches (3.5) inches. Cuts 122 are located at approximately forty-five (45) degree angle increments around the circle defined by first terminal end 118 of first end portion 114.

Second end portion 116 of sleeve 112 preferably defines two sets of cuts 124 that remove a section of the tubular wall of sleeve 112. The two sets of cuts 124 are separated by approximately one hundred and twenty (120) degrees of angle around the circular shaped second terminal end 120 of tubular sleeve 112 and preferably diametrically oppose one another across terminal end 120. Each of the two sets of cuts 124 includes two (2) elongate cuts and one transverse cut 124. The elongate cuts 124 extend a distance-Z from the second terminal end 120 towards the first terminal end 118 and are separated by approximately sixty (60) degrees of angle of second terminal end 120. In this one preferred embodiment, the distance-Z is approximately three (3) inches. The transverse cut 124 in each set is preferably parallel to the second terminal end 120 and extends the approximately sixty (60) degrees between the two elongate cuts 124. The three (3) cuts 124 of each set of cuts 124 removes one rectangular shaped piece of the tubular wall of sleeve 112. It is understood that the diameter of tubular sleeve 112 as well as the quantity, size, and location of cuts 122 and 124 can vary with the intended application of sleeve 112.

Sleeve 112 is preferably fabricated of the same high-density polyethylene (HDPE) material as the plurality of pipes 14, but it is understood that sleeve 112 can be fabricated out a variety of materials to include, but not limited to sheet metal, composites, and fabrics. The tubular structure of sleeve 112 can also be extended longitudinally and define a receptacle for a "built in" weight 100 for sleeve 112 that could be for example, in the form of concrete or cement to provide additional weight 100 to the distal end portion of apparatus 10. Sleeve 112 preferably has a smaller inside diameter than the outer dimensions of the plurality of pipes 14 around central conduit 12 of pipes 14 and the inside diameter of sleeve 112 is larger than the outer dimensions of any pair of pipes 15 connected to one joint 18. The structure of sleeve 12 in with cuts 122 and 124 accommodates the reduction and expansion, respectively, of the tubular structure of sleeve 112 of the tapering of the staggered second end portion 32 of the plurality of pipes 14 and the plurality of joints 18. It is understood that the dimensions identified herein for the length, diameter, and cuts 122 and 124 of sleeve 112 can vary depending upon a variety of factors such as the quantity of individual pipes 15 in any application of the plurality of pipes 14 and the length of the second end portion 32 of the plurality of pipes 14 between the at least one joint 18 and central conduit 12.

Figure 21:
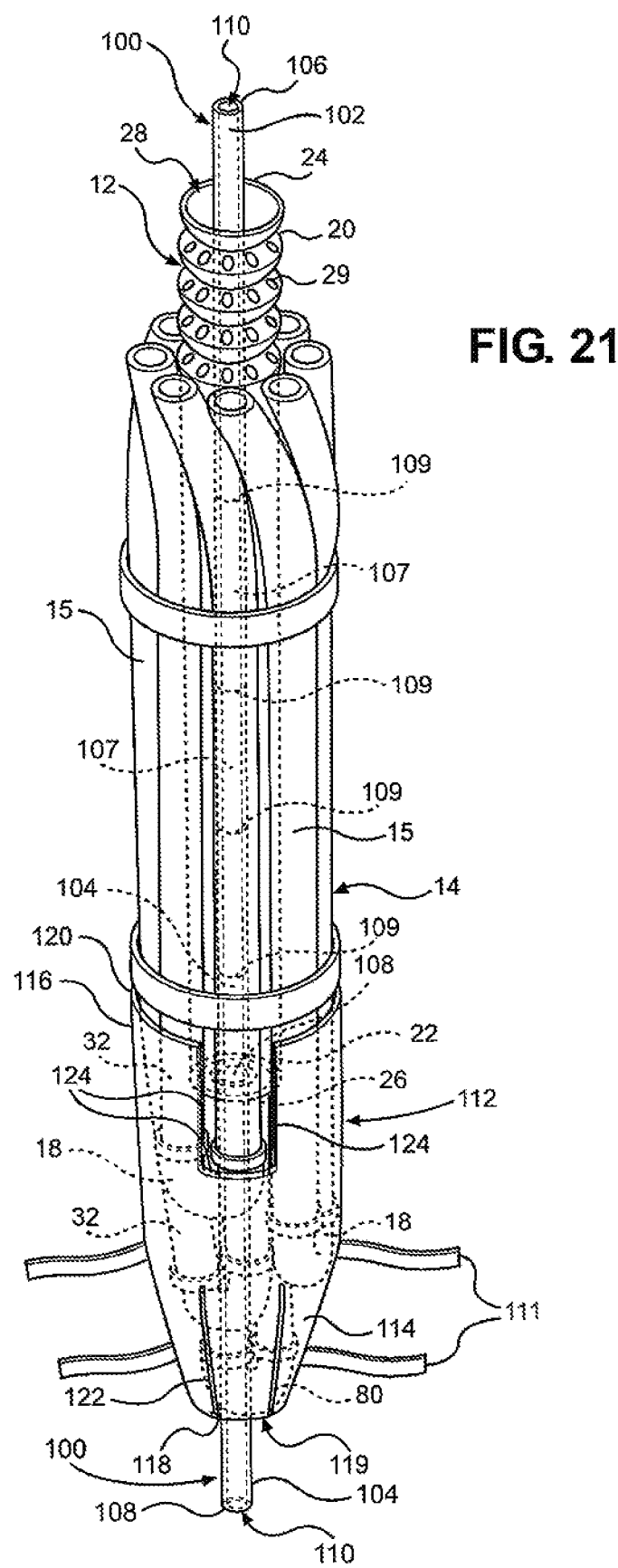
FIG. 21 is a sectional view taken along lines 21-21 of FIG. 18 showing the side perspective view of the geothermal heat exchange apparatus of FIG. 18 with the vertical extension of the central conduit and the weight in the proximal direction above the section and the sleeve positioned at least partially over the second end portion of the plurality of pipes and the plurality of joints.

As shown in FIG. 21, sleeve 112 is connected to the second end portion 32 of the plurality of pipes 14 and the plurality of joints 18. The second end portion 116 of sleeve 112 is positioned over the staggered second end portion 32 of the plurality of pipes 14 and plurality of joints 18. The removed portion from cuts 124 of the second end portion 116 of sleeve 112 accommodate sleeve 112 being positioned in the proximal direction as far as practical over the increasing outer dimensions of the staggered second end portion 32 of the plurality of pipes 14 and plurality of joints 18. It is understood that the diameter and material of sleeve 112 can vary to include creating varying amounts of an inwardly directed compressive bias on the plurality of pipes 14, plurality of joints 18, and weight 100. It is understood that the second end portion 116 of sleeve 112 can be distant from or in proximity to the second terminal end 26 of central conduit 12.

The cuts 122 in the first end portion 114 of sleeve 112 define bendable flaps that are preferably pushed inwards and overlapped to define a tapered structure of the first end portion 114 of sleeve 112. The tapered structure of first end portion 114 provides an adjustable and close-fitting connection with the diminishing outer dimensions in the distal direction of the staggered second end portion 32 of the plurality of pipes 14, plurality of joints 18 and weight 100.

In this one preferred embodiment tape 111 is preferably used to retain the taper in first end portion 114 of sleeve 112 around the second end portion 32 of the plurality of pipes 14 and the plurality of joints 18 and to assist in the connection between sleeve 112 and the plurality of pipes 14 and the plurality of joints 18. Similarly, the second end portion 116 can also include tape 111 or a similar device such as a band 42 to retain the connection between the second end portion 116 of sleeve 112 and the plurality of pipes 14 and the plurality of joints 18.

Weight 100 is an elongate tubular, cylindrical, or bar shaped structure that can be rigid, flexible, or include a series of shorter length segments 107 that are attached to one another by connections 109 along the elongate length of weight 100. Weight 100 connection 109 preferably connects the two adjacent segments 107 such that each segment 107 can move independently relative to other segments 107. Connection 109 can include joint type connections, such as for example, tape, wire, hinges, and/or ball and socket. Each segment 107 of weight 100, or for example, every other segment 107 in the elongate weight 100 can be separately connected and/fixed to the inside of the tubular wall of central conduit 12 as described previously such that weight 100 can flex and coil with central conduit 12.

The connections 109 of weight 100 can also include devices to stiffen weight 100 such as for example, each segment 107 can define an aperture 110 that can be aligned with the longitudinal axis of each segment 107 and the segments 107 connected by a single wire or string through their apertures 110. The length of the single wire can be used to allow play for the individual directional alignment of each segment 107 when apparatus 10 is coiled, for example, and then when the length of apparatus 10 is stretched out, the length of wire in apertures 110 can be shortened to abut each segment 107 tightly to the adjacent segments 107. The terminal ends of segments 107 can also include mating interfaces, such as for example concave and convex shapes, that help the transition of each segment 107 of weight 100 from a flexible alignment to a straight and stiff or rigid alignment that is aligned with longitudinal axis-X to aid in the installation of apparatus 10 in bore hole 8.

Figure 22:
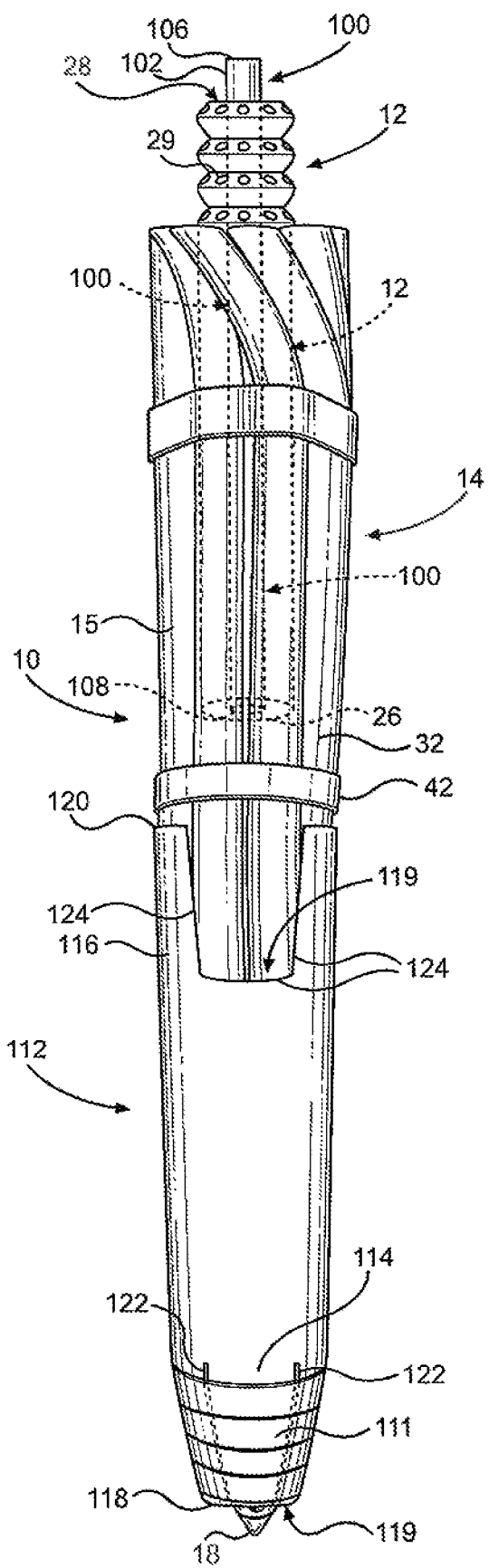
FIG. 22 is a sectional view taken along lines 22-22 of FIG. 18 showing the side perspective view of the geothermal heat exchange apparatus with the vertical extension of the central conduit and weight in the proximal direction above the section and the sleeve positioned over the second end portion of the plurality of pipes and the plurality of joints and the weight retained within weight the central conduit.

Referring now to FIG. 22, in this one preferred embodiment weight 100 is located exclusively in aperture 28 of central conduit 12 with the second terminal end 108 of weight 100 in proximity to the second terminal end 26 of central conduit 12. Weight 100 is fixed in position in central conduit 12 using one or more methods such as, for example, but not limited to taping, bands, and ties through apertures 29, and/or using adhesives to attach weight 100 against the interior of the tubular wall of central conduit 12 and fix weight 100 relative to central conduit 12; strengthening the connection between a cover, plug, or cap to the second terminal end 26 of central conduit 12 using 111. As described above, weight 100 is preferably structured to accommodate the flow of grout 92 through and/or around weight 100 and out through apertures 29 and/or aperture 28 of second terminal end 26 of central conduit 12. For example, the terminal cover or cap or the tape 111 over second terminal end 26 can include apertures that accommodate the flow of grout 92, but prevent weight 100 from passing through second terminal end 26.

Figure 23:
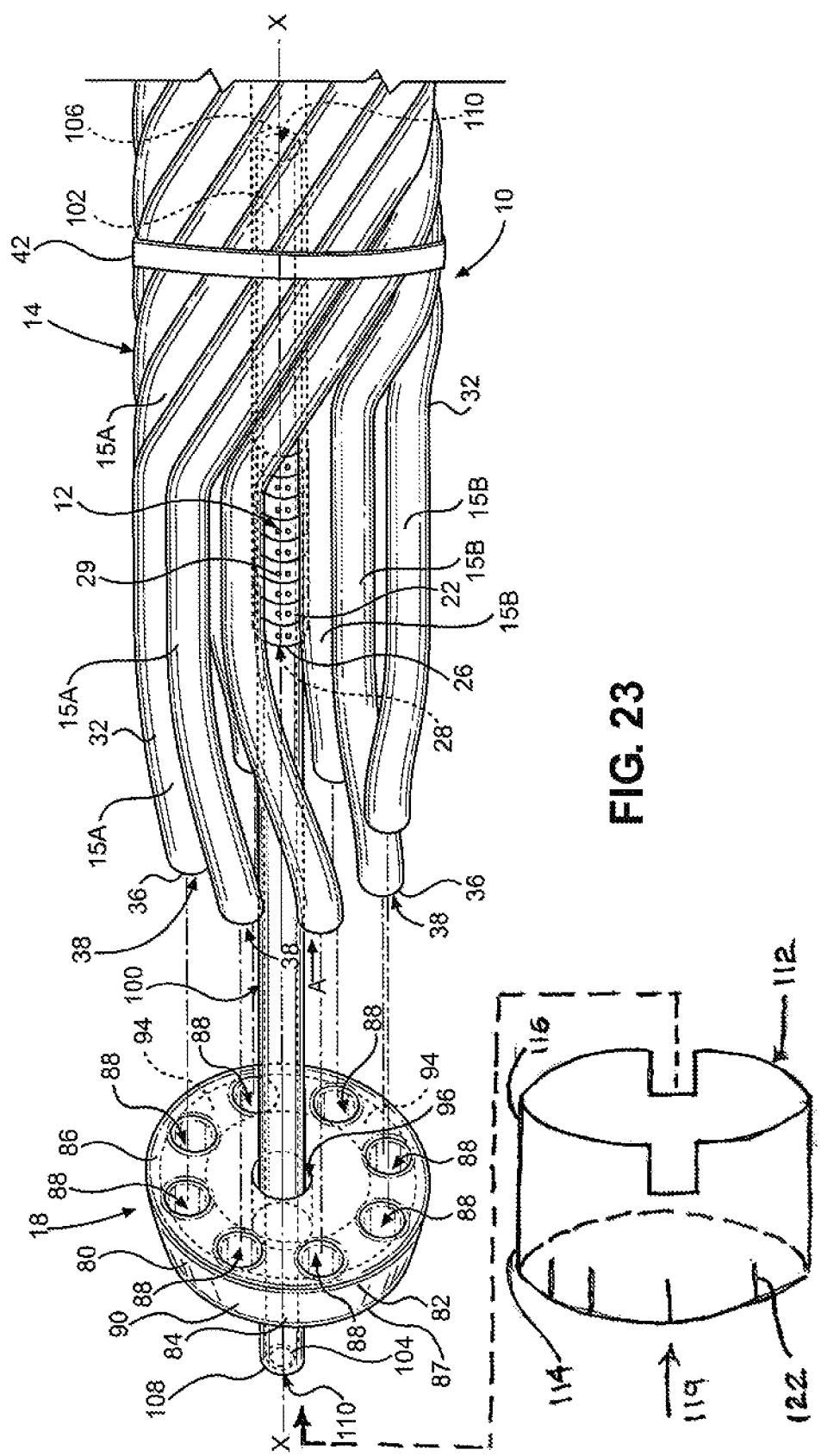
FIG. 23 is a sectional view taken along lines 23-23 of FIG. 18 showing the side perspective view of the geothermal heat exchange apparatus with the vertical extension of the central conduit and weight in the proximal direction above the section and an alternative embodiment of the at least one joint wherein the plurality of pipes connect to one joint, the joint defines a through hole, and the weight is insertable into the central conduit through the through hole in the joint.

As shown in FIG. 23, in another preferred embodiment of the geothermal heat exchange apparatus 10, the at least one joint 18 of geothermal heat exchange apparatus 10 in this one preferred embodiment is a single joint. The second end portion 32 of the plurality of pipes 14 extend a predetermined distance distal the second terminal end 26 of the central conduit and connect to the single joint 18 that preferably has an overall annular shape. Joint 18 in this one preferred embodiment has a housing 80 that includes a first end portion 82 and a second end portion 84. The first end portion 82 and the second end portion 84 are opposed. The first end portion 82 includes a first terminal end 86 and second end portion 84 includes a second terminal end 87. The first terminal end 86 defines a plurality of apertures 88 that connect to the second terminal ends 36 and/or second end portion 32 of the plurality of pipes 14.

Each aperture 88 extends from the second terminal end 86 into housing 80 and connects to a reservoir 90 and/or a single common pipe 94. Common pipe 94 preferably has an annular shape. Common pipe 94 receives the flow from the supply pipes 15A of the plurality of pipes 14 into apertures 88 and the flow in common pipe 94 is drawn through other apertures 88 to the return pipes 15B of the plurality of pipes 14. The supply pipes 15A and return pipes 15B of the plurality of pipes 14 can be advantageously connected to any aperture 88 in this one preferred embodiment. Joint 18 apertures 88 are preferably located in an approximately circular arrangement in proximity to the perimeter of the first terminal end 86.

It is understood that the arrangement of apertures 88 on first terminal end 86 depends upon factors that include minimizing the diameter of joint 18 and ease of connectivity between apertures 88 and the second terminal ends 36 of the plurality of pipes 14. Alternative arrangements of apertures 88 include, for example, a staggered circular arrangement in first terminal end 86 and/or variations in the height of apertures 88 relative to first terminal end 86 in the direction of longitudinal axis-X that adjust for the staggered lengths of pipes 15 of the plurality of pipes 14.

In this preferred embodiment of joint 18, housing 80, and first terminal end 86 preferably define an aperture 96 that extends between first terminal end 86 of first end portion 82 and the second terminal end 87 of second end portion 84. Aperture 96 is not in fluid communication with apertures 88 or common pipe 94. Aperture 96 is preferably aligned with the aperture 28 of central conduit 12, weight 100 and longitudinal axis-X as shown. Aperture 96 can also be omitted from joint 18 in this one preferred embodiment and the outside diameter of joint reduced further.

Figure 24:
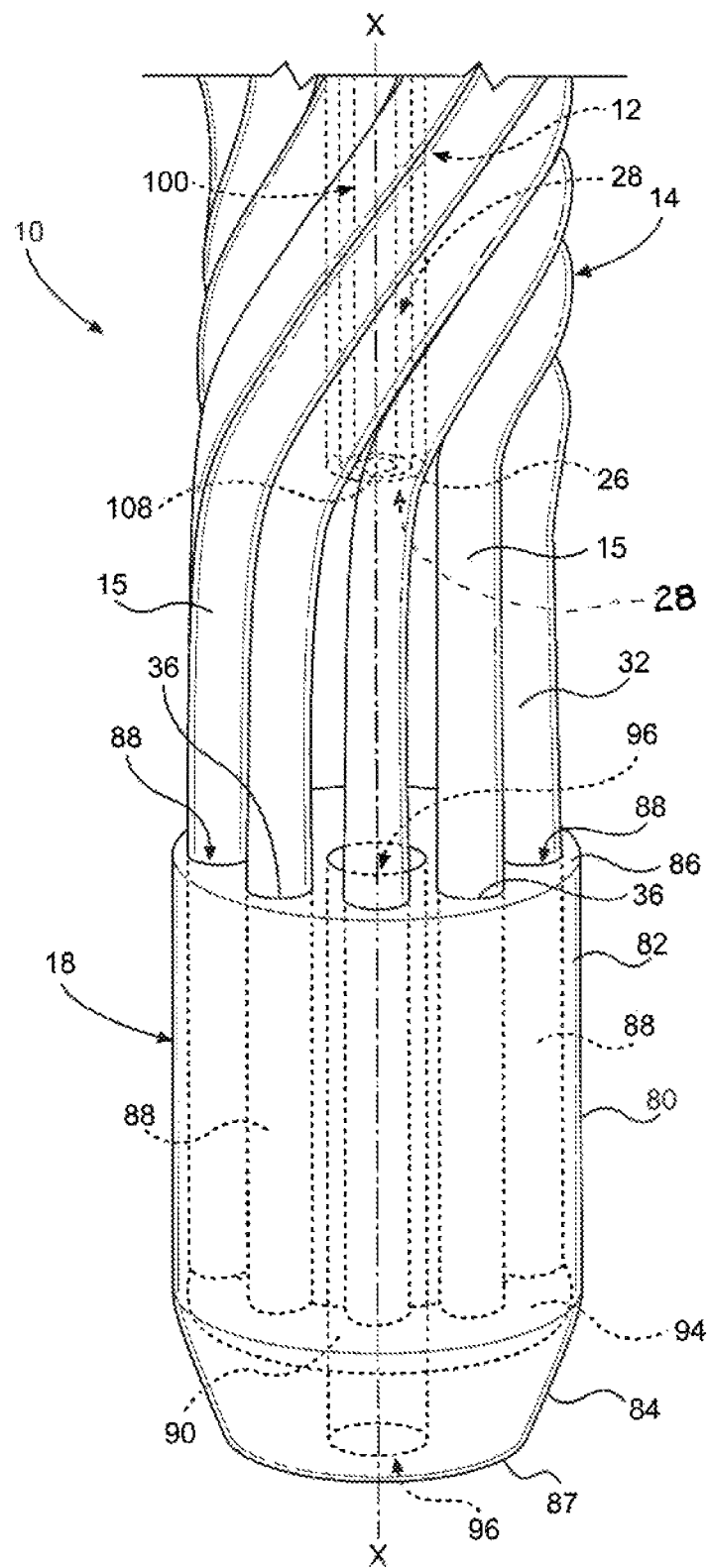
FIG. 24 is a sectional view taken along lines 24-24 showing the side perspective view of the geothermal heat exchange apparatus with a vertical extension of the central conduit and weight in the proximal direction above the section and another alternative embodiment of the at least one joint wherein the plurality of pipes connect to one joint, the joint has an expanded length, the joint defines one through hole, and the weight is inserted into the central conduit through the through hole in the joint, and the weight is located in the central conduit.

Referring now to FIGS. 18, 23, and 24, in another preferred embodiment of the at least one joint 18 of the geothermal heat exchange apparatus 10, FIG. 18, at least one joint 18 is one joint 18 that includes housing 80, first end portion 82, first terminal end 86, apertures 88 and aperture 96 as described previously in FIG. 23, but housing 80 has an extended length between first terminal end 86 and second terminal end 87 in the distal direction along the longitudinal axis-X. While first terminal end 86 is shown as having a planar shape, first terminal end 86 can also include variations in elevation of first terminal end and the variations in the location of apertures 88 as described previously to accommodate variations and/or staggering in the lengths of pipes 15 of the plurality of pipes 14. Housing 80 in this preferred embodiment provides an extended length of protection to the connection between the plurality of pipes 14 and joint 18 due to the elongate structure of joint 18 minimizes the likelihood of joint 18 be turned out of alignment with the longitudinal axis-X by outcroppings and/or irregularities in bore hole 8. Aperture 96 is preferably aligned with aperture 28 of central conduit 12 and weight 100.

As shown in FIGS. 18, 19, 22, and 25 geothermal heat exchange apparatus 10 in one preferred embodiment is fabricated as an assembly that includes central conduit 12, the plurality of pipes 14, two fittings 16, a plurality of joints 18, sleeve 112, and with weight 100 as a component of apparatus 10 that can be connected and fixed in the central conduit 12 in the fabrication of apparatus 10 in the factory as previously described herein or as a separate optional component of apparatus 10 that can be subsequently installed into central conduit 12 of apparatus 10 prior to installation in the bore hole 8.

The fabrication of apparatus 10 without the installation of weight 100 provides the flexibility of not burdening apparatus 10 with weight 100 and additional handling requirements for the added weight 100 when the drilling conditions of the bore hole 8 are foreseen as favorable soil and water conditions. The fabrication of apparatus 10 with the installation of weight 100 accommodates the adding of weight 100 into the central conduit 12 without increasing the overall diameter of apparatus 10 and can optionally provide an elongate element of stiffness to the extended length of apparatus 10 when the condition of the bore hole 8 takes an unexpected turn that can include outcroppings and/or irregularities in the walls of bore hole 8 that can bind and hang up the down hole positioning of apparatus 10. Similarly, the penetration of water in bore hole 8 at least requires the addition of weight 100 in the distal end portion of apparatus 10 or second end portion 32 of the plurality of pipes 14 and at least one joint 18 to penetrate through the water to position the distal end portion of apparatus 10 at the bottom of the bore hole 8.

It is understood that while bore hole 8 conditions in certain geographic locales can be somewhat predictable, bore hole 8 conditions at any given location cannot be predicted with certainty. Thus, there are geographic locales where it is most likely that there will be outcroppings and/or irregularities in bore hole 8 and/or water and it warrants the use of weight 100 through on-site installation and/or fabrication of apparatus 10 with weight 100 connected and fixed in central conduit 12. In other situations, flexibility as to the amount of weight 100 to be employed within central conduit 12 and knowledge of problems with prior installation attempts can be advantageous. For example, an additional amount of weight 100 and/or stiffness of weight 100 may be required to penetrate through deep water in bore hole 8, but a lesser amount of weight 100 to overcome outcroppings and irregularities in bore hole 8. Similarly, there are other geographic locales where the bore hole 8 conditions are known to have a high risk of outcroppings, irregularities and/or high-water levels and favor the installation of weight 100 at the site that is elongate, stiff, and denser than water and stiffly or rigidly connects the central conduit 12 with the plurality of joints 18 to overcome the above-identified problems and others.

When geothermal heat exchange apparatus 10 is initially received at the site of bore hole 8 in its coiled configuration for transportation with either weight 100 installed or weight 100 separated from apparatus 10, apparatus 10 is unwound from its coiled state. When apparatus 10 includes a plurality of joints 18, weight 100 is installed in apparatus 10 on site by removing tape 111 around the outside of sleeve 112 and sleeve 112 is withdrawn in the distal direction from the plurality of joints 18 and the second end portion 32 of the plurality of pipes 14. As required, the pairs of pipes 15 and their respective joints 18 are arranged to provide access to the second end portion 22 of central conduit 12. Weight 100 is moved in the proximal direction as shown in Arrow-A between the plurality of joints 18 connected to the pairs of pipes 15 of the plurality of pipes 14 and inserted into aperture 28 of central conduit 12. As described previously weight 100 can be one or more individual pieces of weight 100 in this preferred embodiment such as pipe and/or rebar that are preferably rigid, elongate, denser than water, and provide flow around or through weight 100 in aperture 28 of central conduit 12. The preferred weight 100 has a small cross-sectional area relative to a cross-sectional area of aperture 28 of central conduit 12 for flow around weight 100 and/or provides flow through weight 100 so as to not unduly restrict the flow of grout 92 through aperture 28 of central conduit 12.

The required amount of weight 100 is selected for a given apparatus 10 and conditions in the bore hole 8. The individual pieces of weight 100, as required, have their respective first terminal end 106 and/or second terminal end 108 protected to prevent any gouging or ripping of central conduit 12 and are preferably connected using bands, ties, clamps, and/or tape. The protection of first terminal end 106 and/or second terminal end 108 of weight 100 can include the use of polymer caps, polymer packaging material and heavy-duty tape. Weight 100 first end portion 102 is inserted into aperture 28 of central conduit 12 and second terminal end 26 is positioned at a desired location relative to the second terminal end 26 of central conduit 12.

Referring now to FIGS. 18 and 19, in one preferred embodiment of geothermal heat exchange apparatus 10, weight 100 has a position and length that includes weight 100 extending in the proximal direction a predetermined distance within aperture 28 of the central conduit 12 and extending in the distal direction for a predetermined distance beyond the terminal end 26 of the central conduit 12, plurality of pipes 14, plurality of joints 18, and sleeve 112.

Weight 100 is preferably connected to the central conduit 12 once the second terminal end 108 is located at the desired distance distal to the at least one joint 18, second end portion 32 of the plurality of pipes 14, and sleeve 112. Weight 100 is preferably connected to and fixed relative the central conduit 12 using tape 111, ties, and/or bands as described previously. The second end portion 32 of the plurality of pipes 14 and their respective joints 18 of the plurality of joints 18 are then as appropriate taped, tied or banded together in an alignment that can include a transition from the helical arrangement of the plurality of pipes to the approximately straight alignment with the longitudinal axis-X in the second end portion 32.

The connection of sleeve 112 into a tight fitting, binding, and compressing relationship around the staggered plurality of pipes 32 and plurality of joints 18 preferably includes positioning the plurality of joints 18 and at least a portion of the second end portion 32 through aperture 119 of the second end portion 116 of sleeve 112 and/or pulling sleeve 112 over the plurality of pipes 32 and plurality of joints 18. The tight fitting, binding, and compressing relationship with the preferably staggered plurality of pipes 32 and plurality of joints 18 also fixes weight 100 in position relative to the second end portion 32 and central conduit 12.

Tape 111, a heavy-duty tape, is then applied again to secure the position and reinforce the cuts 122 of first end portion 114 and cuts 124 of second end portion 116 of sleeve 112. Tape 111 preferably secures and reinforces the overlapped positions of the flaps defined by cuts 122 to define a close-fitting taper around the staggered plurality of joints 18. Tape 111 can reinforce and secure the overlapping position of the flaps defined by the cuts 122 to close aperture 119 in first end portion 114 or alternatively reinforce and secure the overlapping position of the flaps defined by cuts 122 to define a reduced sized diameter aperture 119 in first end portion 114 of sleeve 112. Retaining aperture 119 in sleeve 112 provides for a free flow of fluids through sleeve 112 which is preferable for the flow of grout 92 and removal of air pockets and water from borehole 8. Tape 111 is preferably used to secure the second end portion 104 of weight 100 to the first end portion 114 of sleeve 112. Tape 111 also preferably secures and reinforces the connection between the second end portion 116 of sleeve 112 and the second end portion 32 of the plurality of pipes 14.

Once weight 100 is installed into and connected to aperture 28 of central conduit 12 on site and geothermal heat exchange apparatus 10 is re-assembled, apparatus 10 can then complete its final connections, testing, inspections, and installation into bore hole 8.

Referring now to FIGS. 18 and 22, in one preferred embodiment of geothermal heat exchange apparatus 10, weight 100 has a position and length that includes weight 100 extending in the proximal direction a predetermined distance within aperture 28 of the central conduit 12 and extending in the distal direction for a predetermined distance to a point within aperture 28 before reaching second terminal end 26 of the central conduit 12. Weight 100 in this preferred embodiment if preferably located within aperture 28 and in proximity to second terminal end 26. Weight 100 is connected to and fixed in position in aperture 28, against the tubular wall of and relative to central conduit 12 as described previously above using, tape 111, bands, ties, caps and/or terminal end connections to second terminal end 26 of central conduit 12.

The position of weight 100 solely within aperture 28 of central conduit 12 has advantages in that the installation of weight 100 into aperture 28 does not require securing weight 100 within the extended length of the plurality of pipes 14, plurality of joints 18, and sleeve 112. This one preferred embodiment combines a simpler connectivity between weight 100 and central conduit 12 and the advantage of adding weight 100 to the extended length and inherent stiffness of the second end portion 32 of the plurality of pipes 14 and plurality of joints 18 which is more than adequate under most circumstances to prevent geothermal heat exchange apparatus 10 from being hung up on outcroppings and irregularities within bore hole 8.

Figure 25:
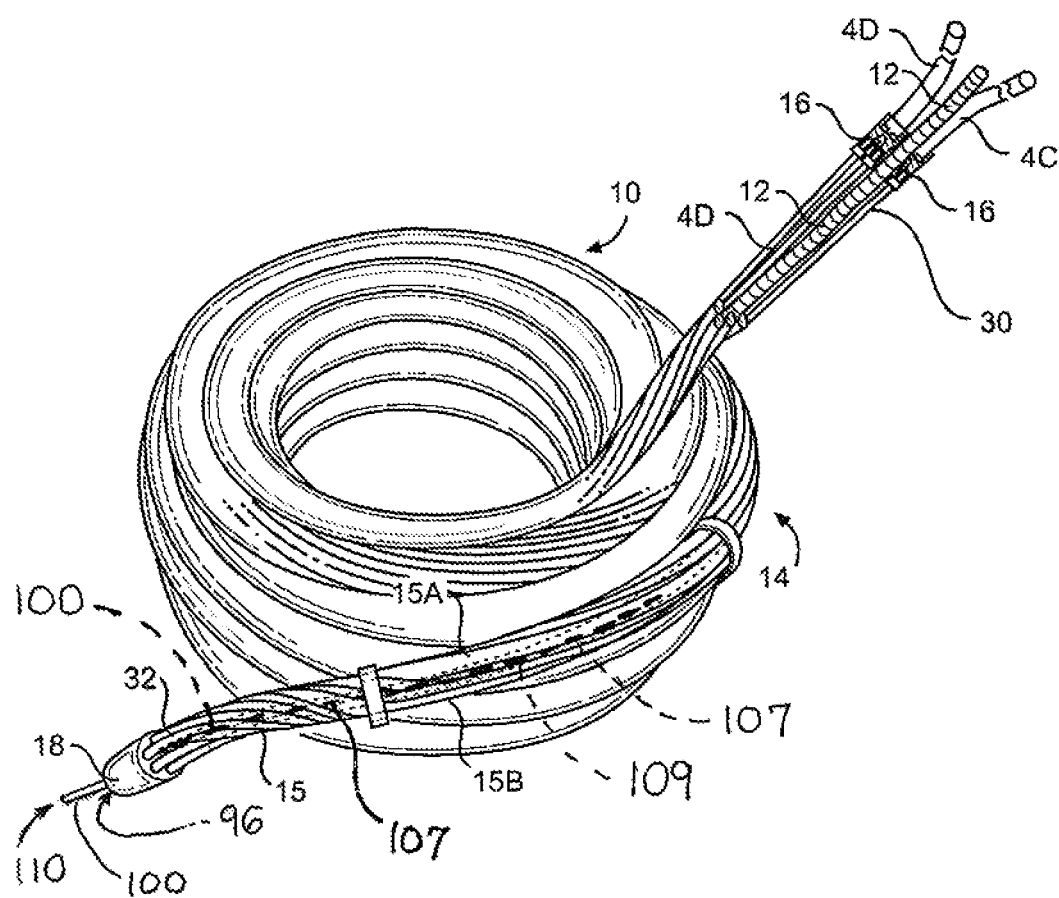
FIG. 25 is a top and side perspective view of the geothermal heat exchange apparatus of FIG. 23 with the weight positioned in the central conduit and extending through the joint and the weight including multiple connected segments in the central conduit that accommodate being coiled into a roll, the view further including a partial cut-away of the first end portion of the plurality of pipes showing the interior of the fittings and the connections to the primary pipes.

As shown in FIGS. 18, 21, and 25 weight 100 can also be integrated into the fabrication of the geothermal heat exchange apparatus 10 as described above by making weight 100 suitable for being coiled with the central conduit 12, plurality of pipes 14, at least one fitting 16, and at least one joint 18 for ease of storage and/or transportation. As shown, the elongate weight 100 is shown as having multiple individual segments 107 of a predetermined abbreviated length that are joined by connections 109. In one preferred embodiment the lengths of segments 107 is between three (3) and (4) four feet, but it is understood that segments 107 and connections 109 of weight 100 can vary in length and extend from within aperture 28 of central conduit 12 to distal to the plurality of joints 18. As described above, the segments 107 can be configured to have a single wire extend through all segments 107 that can be loosened to accommodate flexing at connections 109 and then drawn tight to secure segments 107 in a rigid straight linear alignment for insertion into bore hole 8. The use of flexible connections 109 with rigid sections 107 of the various structural configurations described herein for weight 100 that can be coiled and uncoiled within central conduit 12 can be applied to any of the embodiments presented herein.

As shown in FIGS. 18, 24, and 25 geothermal heat exchange apparatus 10 in one preferred embodiment is fabricated as an assembly that includes central conduit 12, the plurality of pipes 14, at least one fitting 16, a single joint 18, sleeve 112 and weight 100 as a components of apparatus 10 that can be connected and fixed in the central conduit 12 in the fabrication of apparatus 10 as previously described herein or subsequently installed into the apparatus 28 of and connected to central conduit 12 prior to installation of apparatus 10 in the bore hole 8.

In one additional preferred embodiment of sleeve 112, the first end portion 114 of sleeve 112 connects to the second end portion 84 of joint 18 and sleeve 112 second end portion 116 extends proximally towards central conduit 12 and connects one or more pipes 15 of the plurality of pipes 14. In this embodiment of sleeve 112, cuts 122 in first end portion 114 of sleeve 112 can taper first end portion 114 with the tapering of joint 18 second end portion 84. Second end portion 116 of sleeve 112 extends past first terminal end 86 of joint 18, connects to the second end portion 32 of the plurality of pipes 14 and acts as a tubular flexible shield around the connections between the second end portion 32 of the plurality of pipes 14 and apertures 88 during the handling associated with the preparation for and the descent of apparatus 10 down Sleeve 112 can be connected to and fixed in position around the second end portion 32 of the plurality of pipes 14 between central conduit 12 and joint 18. This embodiment of sleeve 112 can have a larger diameter to accommodate the diameter of single joint 18 or alternatively have a smaller diameter such as in FIG. 18 with the plurality of joints 18 to limit the movement individual pipes 15 of, provide outcropping protection for, and add stiffness to the plurality of pipes 14.

When weight 100 extends through aperture 96 of joint 18, weight 100 is preferably connected to and fixed in position in aperture 96 of joint 18. Methods for connecting weight 100 in aperture 96 of joint 18 include those described previously for central conduit 12 that include the use of tape 111, bands, and/or ties. Further, the structure of housing 80 of joint 18 can include and/or adhesives.

Referring now to FIGS. 18 and 24, single joint 18 has an elongate tubular first end portion 82 and a second end portion 84. First end portion 82 and second end portion 84 are opposed. The elongate first end portion 82 includes apertures 88 that extend between first terminal end 86 and common pipe 94. In this embodiment, common pipe 94 is in and/or in proximity to second end portion 84 of joint 18. Sleeve 112 first end portion 114 preferably connects to first end portion 82 of joint 18 and the second end portion 32 of the plurality of pipes 14 to provide an additional layer of protection from bore hole 8 outcroppings and irregularities. The elongate joint 18 has advantages in that the combination of the elongate first end portion 82 and tapered second end portion 84 is more likely to stay aligned during the descent in the bore hole 8. This combination reduced the likelihood of damage to the connections between the individual pipes 15 of the plurality of pipes 14 and joint 18. The taper of second end portion 84 and added weight of the fluid in the elongate joint 18 can also beneficially add to the ability to overcome outcroppings and irregularities in bore hole 8. The other advantages identified above in connection with the single joint embodiment in FIG. 23 are also applicable to the elongate single joint 18.

In the preceding specification, the present disclosure has been described with reference to specific exemplary embodiments thereof. It will be evident, however, that various modifications, combinations, and changes may be made thereto without departing from the broader spirit and scope of the invention as set forth in the claims that follow. While the present disclosure is described in terms of a series of embodiments, the present disclosure can combine one or more novel features of the different embodiments. The specification and drawings are accordingly to be regarded in an illustrative manner rather than a restrictive sense.

What is claimed is:

1. A geothermal heat exchange apparatus for installation in a borehole, the geothermal heat exchange apparatus comprises:

a central conduit, the central conduit has a first end portion, a center portion, and a second end portion, the first end portion includes a first terminal end, the second end portion includes a second terminal end, the central conduit defines an aperture and the aperture extends through the first terminal end of the first end portion through the center portion to the second terminal end of the second end portion, the central conduit is flexible;

a plurality of pipes, each pipe of the plurality of pipes has a first end portion, a center portion and a second end portion, the first end portion includes a first end portion and a first terminal end, the center portion of the plurality of pipes is in a helical arrangement around the central conduit, the second end portion includes a second end portion and a second terminal end, each pipe of the plurality of pipes defines an aperture that extends between a first terminal end and a second terminal end of each pipe, the plurality of pipes is flexible, the plurality of pipes is in direct contact with the central conduit, the plurality of pipes is bound to the central conduit, the plurality of pipes includes at least two pipes that are supply pipes and at least two pipes that are return pipes, the plurality of pipes is not in fluid communication with the central conduit;

at least two fittings, each fitting is a manifold connector, each fitting has a first end portion, and the first end portion includes a first aperture, the at least two fittings have a second end portion and the second end portion includes at least two second apertures, the at least two second apertures connect to at least two pipes of the plurality of pipes;

at least one joint, the at least one joint is a single manifold joint with a through hole, the joint includes a first end portion and an opposed second end portion, the first end portion provides fluid communication from at least two supply pipes of the plurality of pipes to at least two return pipes of the plurality of pipes;

and a weight, the weight has an elongate shape, the weight positioned in the aperture of the central conduit and the through hole of the joint and the weight connected to the central conduit and the joint, the weight including at least one aperture, the at least one aperture is adapted to accommodate the flow of grout through the weight and through aperture in the second terminal end of the central conduit, the aperture in the weight is in fluid communication with the aperture of the central conduit.

2. The geothermal heat exchange apparatus of claim 1 wherein the at least one joint has a first terminal end and a second terminal end, the first terminal end connects to at least one supply pipe and at least one return pipe of the plurality of pipes.

3. The geothermal heat exchange apparatus of claim 2 wherein the at least one joint is a single manifold connector, the joint first terminal end connects to and is in fluid communication with at least two pipes of the plurality of pipes that are supply pipes and the at least two pipes of the plurality of pipes that are return pipes.

4. The geothermal heat exchange apparatus of claim 1 wherein the geothermal heat exchange apparatus includes the weight is in the aperture of the central conduit and connected to the central conduit, the geothermal heat exchange apparatus is coilable, and is ready for connection to the primary pipes and insertion into the bore hole for geothermal heat exchange.

5. The geothermal heat exchange apparatus of claim 1 wherein the weight is positioned in the aperture of the central conduit and the weight is connected to the central conduit and extends in the distal direction for a predetermined distance past the second end portion of the plurality of pipes and the at least one joint.

6. The geothermal heat exchange apparatus of claim 1 wherein the connection between the weight, joint, and central conduit accommodates additional weight being added to the weight.

7. The geothermal heat exchange apparatus of claim 1 wherein a sleeve is connected around the second end portion of the plurality of pipes and the joint in a tight fitting, binding, and compressing relationship.

8. The geothermal heat exchange apparatus of claim 1, wherein the weight includes solid rods and the rods define at least one aperture in fluid communication with the central conduit.

9. The geothermal heat exchange apparatus of claim 1, wherein the weight extends in the distal direction at least to the second end portion of the at least one joint and the weight is connected to the at least one joint.

10. The geothermal heat exchange apparatus of claim 1, wherein the weight includes one or more individual pieces of weight.

11. A geothermal heat exchange apparatus for installation in a borehole, the geothermal heat exchange apparatus comprises:

a central conduit, the central conduit has a first end portion, a center portion, and a second end portion, the first end portion includes a first terminal end, the second end portion includes a second terminal end, the central conduit defines an aperture and the aperture is a through hole, the central conduit is flexible;

a plurality of pipes, each pipe of the plurality of pipes has a first end portion, a center portion and a second end portion, the first end portion is aligned with the central conduit and includes a first terminal end, the center portion is in a helical arrangement around the central conduit, the second end portion includes a second terminal end, each pipe of the plurality of pipes defines an aperture that extends the length between the first terminal end and the second terminal end, each pipe of the plurality of pipes is flexible, the plurality of pipes is in direct contact with the central conduit, the plurality of pipes is bound to the central conduit, the plurality of pipes includes at least two pipes that are supply pipes and at least two pipes that are return pipes, the plurality of pipes is not in fluid communication with the central conduit;

at least two fittings, each fitting is a manifold connector, each fitting has a first end portion and the first end portion includes a first aperture, each fitting has a second end portion that includes at least two second apertures, the first aperture is opposed to and aligned with the at least two second apertures, the at least two second apertures connect to at least two pipes of the plurality of pipes;

at least one joint, the at least one joint is a single manifold joint that includes a first end portion and an opposed second end portion, the first end portion provides fluid communication from at least two supply pipes of the plurality of pipes to at least two return pipes of the plurality of pipes, the joint defines a through hole that receives the central conduit; and a weight, the weight having an elongate and a rigid structure, the weight positioned in the aperture of the central conduit, the weight including at least one aperture, the at least one aperture is adapted to accommodate the flow of grout through the weight joint, and aperture in the second terminal end of the central conduit, the weight is connected to the joint and the weight connected to the central conduit.

12. The geothermal heat exchange apparatus of claim 11, wherein the weight is positioned in the aperture of the central conduit, fixed in position in the central conduit, and extends in the distal direction for a predetermined distance past the sleeve, second end portion of the plurality of pipes and the at least one joint.

13. The geothermal heat exchange apparatus of claim 11, wherein the weight is contained within the aperture of the central conduit and the weight is connected to and fixed in position in the aperture of the central conduit.

14. The geothermal heat exchange apparatus of claim 11, wherein the weight includes multiple individual rigid segments, the rigid segments are connected, the rigid segments are independently movable within the aperture of the central conduit and accommodate the coiling of geothermal heat exchange apparatus, the segments have a straight and rigid alignment in the central conduit for insertion into the bore hole.

15. The geothermal heat exchange apparatus of claim 11 that further includes a sleeve, wherein the sleeve defines a receptacle for additional weight within the sleeve and the sleeve connects around the at least one joint and the sleeve connects around the plurality of joints, the weight, and the second end portion of the plurality of pipes.

16. The geothermal heat exchange apparatus of claim 11, wherein the weight includes solid rods and the rods define at least one aperture in fluid communication with the central conduit.

17. The geothermal heat exchange apparatus of claim 11, wherein the geothermal heat exchange apparatus is coilable, and adapted for connection to the primary pipes and insertion into the bore hole for geothermal heat exchange.

18. The geothermal heat exchange apparatus of claim 11, wherein the weight includes one or more individual pieces of weight.

19. The geothermal heat exchange apparatus of claim 11, wherein the weight is a pipe and the weight extends in the distal direction from the central conduit and the weight connected to the second end portion of the plurality of pipes and the at least one joint, the pipe is in fluid communication with the aperture of the central conduit and the pipe is adapted for the flow of grout, the second terminal end of the weight adapted for positioning at the bottom of a bore hole for the dissemination of grout.

20. The geothermal heat exchange apparatus 11, wherein the plurality of pipes, at least one joint, and the weight are connected.

* * * * *